United States Patent
Lee et al.

(10) Patent No.: US 7,099,631 B2
(45) Date of Patent: Aug. 29, 2006

(54) MOBILE PHONE HAVING REDUCED SPECIFIC ABSORPTION RATE (SAR) USING AN ANTENNA HOUSED TO ENSURE ENHANCED ANTENNA GAIN

(75) Inventors: Tae Yune Lee, Seoul (KR); Je Hoon Yun, Daejon (KR); Jae Ick Choi, Daejon (KR); Jong Hwa Kwon, Daejon (KR); Hyun Ho Park, Busan (KR)

(73) Assignee: Electronics and Telecommunications Research Institute, Taejon (KR)

( * ) Notice: Subject to any disclaimer, the term of this patent is extended or adjusted under 35 U.S.C. 154(b) by 258 days.

(21) Appl. No.: 10/380,000

(22) Filed: Mar. 4, 2003

(65) Prior Publication Data

US 2004/0023682 A1 Feb. 5, 2004

Related U.S. Application Data

(63) Continuation of application No. PCT/KR01/01454, filed on Aug. 29, 2001.

(30) Foreign Application Priority Data

| Sep. 4, 2000 | (KR) | 2000-52068 |
| Sep. 5, 2000 | (KR) | 2000-52350 |
| Sep. 5, 2000 | (KR) | 2000-52351 |
| Sep. 5, 2000 | (KR) | 2000-52352 |

(51) Int. Cl.
*H04B 1/06* (2006.01)
*H04M 1/00* (2006.01)

(52) U.S. Cl. ............... 455/90; 455/272; 455/550.1; 455/562.1; 455/575.1; 343/702

(58) Field of Classification Search ............... 343/702, 343/718, 841, 899, 700 MS, 895, 906; 455/550.1, 455/575.1, 90, 272, 562.1, 575.7
See application file for complete search history.

(56) References Cited

U.S. PATENT DOCUMENTS

| 5,335,366 | A | * | 8/1994 | Daniels ................. 455/575.5 |
| 5,530,919 | A | * | 6/1996 | Tsuru et al. ............ 455/575.5 |
| 5,657,386 | A | * | 8/1997 | Schwanke ............. 379/433.13 |
| 6,184,835 | B1 | * | 2/2001 | Chen et al. ................ 343/702 |
| 6,246,373 | B1 | * | 6/2001 | Aoki ......................... 343/702 |
| 6,763,245 | B1 | * | 7/2004 | Satoh et al. ............ 455/550.1 |
| 2001/0053464 | A1 | * | 12/2001 | Ra ............................. 428/692 |
| 2001/0053673 | A1 | * | 12/2001 | Toyoda et al. .............. 455/90 |
| 2002/0055336 | A1 | * | 5/2002 | Hong .......................... 455/90 |

(Continued)

FOREIGN PATENT DOCUMENTS

JP 4-127723 4/1992

(Continued)

*Primary Examiner*—Don Wong
*Assistant Examiner*—Chuc Tran
(74) *Attorney, Agent, or Firm*—Seed IP Law Group PLLC

(57) ABSTRACT

The present invention relates to a structure of an antenna and its shielding structure for a mobile phone which may significantly reduce the hazardous electromagnetic wave transmitted to the user's body. The present invention arranges a monopole antenna inside of the mobile phone housing, and installs an electromagnetic wave absorber between the antenna and the circuit board. The electromagnetic wave absorber can absorb the electromagnetic wave reflected form conductive plate constituting the circuit board. Thus, the adverse effect of the reflected electromagnetic wave to the performance of antenna is prevented and the amount of the electromagnetic wave to which the users is exposed can be significantly reduced as well.

12 Claims, 32 Drawing Sheets

U.S. PATENT DOCUMENTS

2002/0148625 A1 * 10/2002 Darling et al. ............ 174/35 R

FOREIGN PATENT DOCUMENTS

| KR | 10-0196464 | 2/1999 |
| KR | 20-0196375 | 7/2000 |
| KR | 2001-0004442 | 1/2001 |

* cited by examiner

MOBILE PHONE HAVING REDUCED SPECIFIC ABSORPTION RATE (SAR) USING AN ANTENNA HOUSED TO ENSURE ENHANCED ANTENNA GAIN

CROSS-REFERENCE TO RELATED APPLICATION

This application is a continuation under 35 U.S.C. § 111(a) of International Application PCT/KR01/01454, with an international filing date of Aug. 29, 2001, now pending; which application is incorporated herein by reference in its entirety.

BACKGROUND OF THE INVENTION

1. Field of the Invention

The present invention relates to a structure of an antenna for a mobile phone, and more particularly, to a structure of an antenna for a mobile phone capable of reducing hazardous electromagnetic waves transmitted to the user's head and body.

2. Description of the Related Art

Hereinafter, a "mobile phone" refers to, unless specified otherwise, various potable communicating equipments, which comprise the mobile phone and hand-set of wire phone used for mobile communications such as IMT2000, CDMA, PCS, TDMA, GSM, AMPS and the like.

A "front-side" of the mobile phone refers to, unless specified otherwise, the side of the mobile phone on which a speaker and a microphone are disposed which becomes in contact with user's face (i.e., check) during communication.

Electromagnetic wave refers to the wave propagating at the light speed in a space where two physical components of the electric field and the magnetic field resonate each other, and also it is generated from various electric/electronic appliances. It has been confirmed that the heat generated by the electromagnetic wave with high frequency arriving at the body to raise the temperature of human body, and the Stimulus to the nerve system by the electric current induced by low frequency electromagnetic wave adversely affect the health of human body.

As the communication technologies advance, the mobile phone is used close to the user's head for extended time, and it has widely penetrated into the life of ordinary people. Since the electromagnetic wave emitted from the mobile phone is absorbed into the body, the effects caused by the electromagnetic wave of the mobile phone to the human body have been studied in various aspects.

Because of public opinion concerning the hazards caused by the electromagnetic wave of the mobile phone, it is difficult to use the mobile phone in hospitals, oil-stations and the like where delicate electronic equipments are used. Also, there have been intense discussions on whether the electromagnetic wave generated by a mobile phone affects the healthy of body or not.

Since an apparatus for converting the transmitted radio wave signals into voice signals in the mobile phone typically is integrated in the inside of the receiver, it is reported that hot spots affecting the body are generated in the receiver during communication, and thus generate substantial amount of hazardous electromagnetic wave. Also, since the conventional antenna of the mobile phone is installed at the outside of the mobile phone, and it has non-directional radiation pattern to sense the electromagnetic waves in all directions a large amount of electromagnetic wave is absorbed in the body, particularly in the head.

In order to protect the body from the hazards of electromagnetic wave, a number of developed countries have regulated the MPE (Maximum Permissible Exposure) to the human body. Thus, in Korea, study meetings on this topic have been organized, by private citizens, and a standard for protecting the body from the electromagnetic wave generated by the mobile phone and the like has been prepared. In USA, a standard for protecting the body from electromagnetic wave was prepared, and from 1999, the SAR of mobile phones with respect to the user's head portion (1.6 mW/g) is controlled tightly.

Therefore, the mobile phones satisfying the international regulations concerning the SAR become more important, and an antenna, which is able to meet the regulations, is needed.

Although it has been proposed to use a pad on the surface of the hearing part of the mobile phone to absorb the electromagnetic wave, it adversely affects the appearance of the mobile phone, and its effects are insufficient as well.

On the other hand, the present invention provides an antenna structure installed inside of a housing of a mobile phone and increasing the gain of antenna by arranging an electromagnetic wave absorber between the circuit board and the antenna.

This structure of the antenna, however, must overcome the limitation of the space to be installed within the housing since the size of the mobile phone becomes more compact.

BRIEF SUMMARY OF THE INVENTION

To overcome the problems of the conventional antenna of a mobile phone, the present invention provides a structure of an antenna for a mobile phone which is capable of effectively lowering the electromagnetic wave transmitted to the user's body, particularly the head, and capable of being easily accommodated in the housing without affecting the appearance or causing inconveniences to the users.

In order to these objectives, a mobile phone according to the present invention comprises a) at least one circuit board being used to accommodate various electronic devices performing various functions such as transmission and reception of electromagnetic wave; b) an antenna being used to allow said electronic devices installed on said circuit board to transmit/receive the electromagnetic wave; and a housing in which said circuit board is contained, wherein said antenna is arranged in said housing, and an electromagnetic wave absorber is arranged between said circuit board and said antenna.

Also, according to the present invention, said antenna is arranged in a position adjoining the rear wall of the housing, and said electromagnetic wave absorber encloses the antenna in cooperation with one of side walls and the rear wall of the housing.

Also, according to the present invention, said antenna is arranged in said housing, and said electromagnetic wave absorber has a shape of channel enclosing the circumference of the antenna with a degree greater than 180°, and said electromagnetic wave absorber is open in a part of the circumference of the antenna.

Also, according to the present invention, a mobile phone according to the present invention comprises a) at least one circuit board being used to accommodate various electronic devices performing various functions such as transmission and reception of electromagnetic wave; b) an antenna being used to allow said electronic devices installed on said circuit board to transmit/receive the electromagnetic wave; and c) a housing in which said circuit board is contained, wherein said antenna is arranged in said housing, and an electromagnetic wave absorber is arranged between said circuit board and said antenna; and said electromagnetic wave absorber is arranged to cover only a part of the antenna along the length of the antenna.

Preferably, said electromagnetic wave absorber has a bottom portion attached to the circuit board, and has a pair of side walls extending from both sides of said bottom portion toward the rear side of the mobile phone.

The specific absorption rate (SAR) is defined by following equation with respect to electromagnetic field with a sinusoidal wave form, and the SAR is known as the principal parameter indicating the interaction between the electromagnetic wave and human body;

$$SAR = \frac{\sigma}{2\rho} |E_i^2|$$

where σ is conduction rate of the object at the radiation frequency (S/m), ρ is the density of the object [kg/m$^3$], and E$_i$ is an intensity of electric field within the object [V/m]. As shown in the equation, the SAR is proportional to the square of the intensity of electric field, and the conduction rate and the density are constant. Accordingly, SAR is inversely proportional to the square of the distant from the radiation source to the object.

Therefore, by arranging the antenna inside of a mobile phone and arranging an electromagnetic wave absorber with an adequate shape at an adequate position, the present invention may effectively lower the amount of the electromagnetic wave radiated from a mobile phone and absorbed into user's body.

BRIEF DESCRIPTION OF THE DRAWINGS

The embodiments of the present invention will be explained with reference to the accompanying drawings, in which.

DETAILED DESCRIPTION OF THE INVENTION

Referring now to accompanied drawings, preferred embodiments of the present invention are described in detail below.

Figure 1:
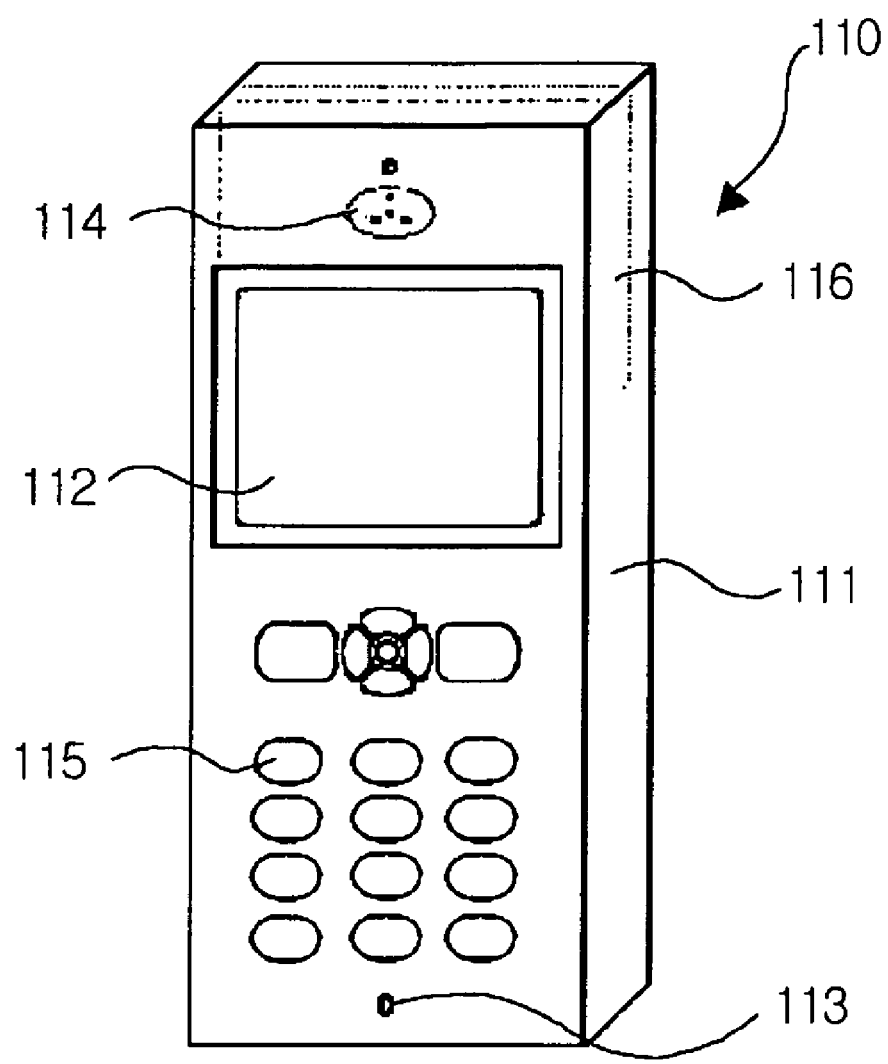
FIG. 1 is a front view of a mobile phone according to the first embodiment of the present invention.
Figure 2:
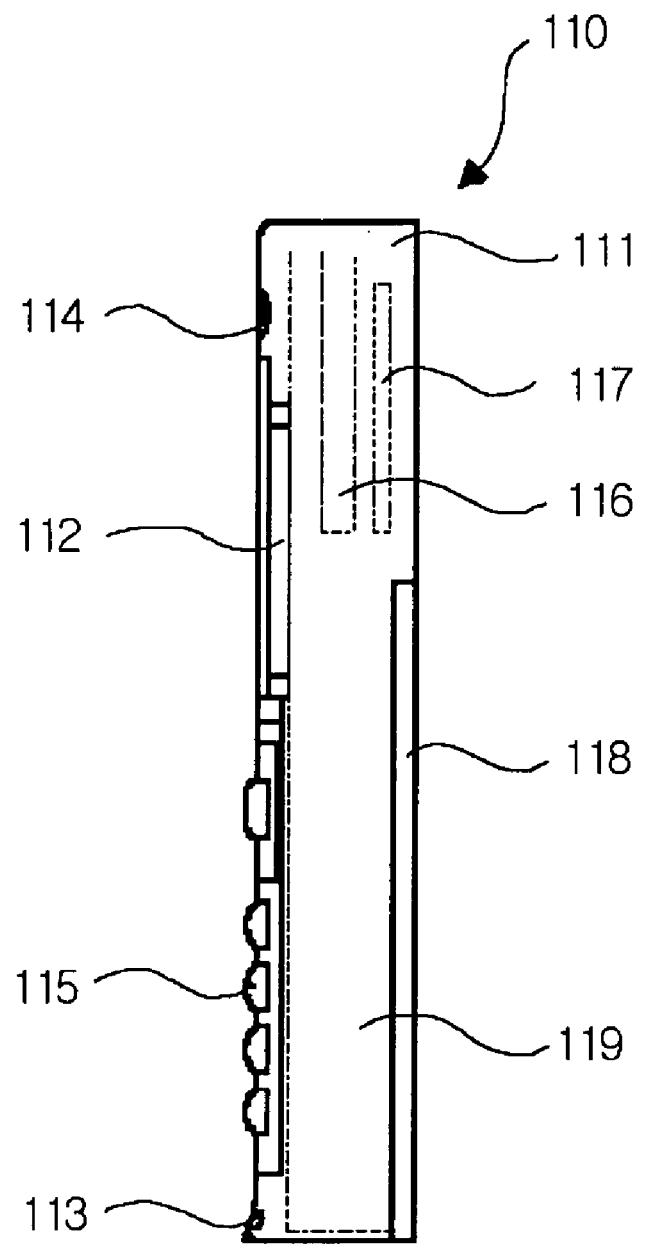
FIG. 2 is a right-side view of the mobile phone in FIG. 1.
Figure 3:
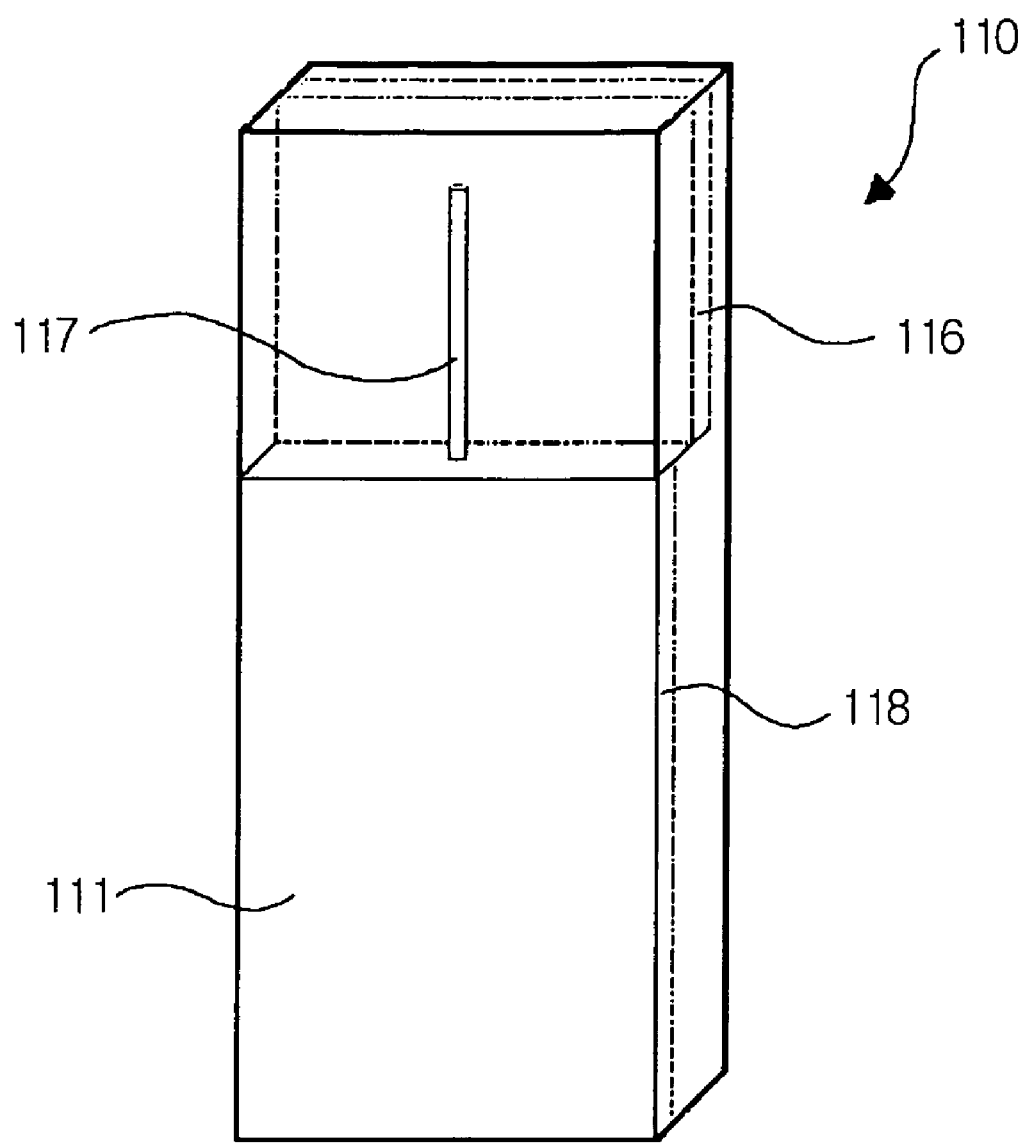
FIG. 3 is a rear view of the mobile phone in FIG. 1.

FIG. 1 to FIG. 3 illustrates the structure of a mobile phone 110 according to the first embodiment of the present invention.

In this embodiment, a monopole antenna 117 is arranged on the upper side of the mobile phone 110. The mobile phone 110 comprises housing 111, display device 112 such as LCD, microphone for transmitting voice 114, a keypad 115, an electromagnetic wave absorber 116, a monopole antenna 117, a battery 118 and circuit board 119. Here, the major parts of the circuit board 119 in the mobile phone 110 and the electrical parts mounted thereon are made of conductive material. If the monopole antenna 117 is installed inside of the mobile phone 110, the conductive plate being used as the circuit boards 119 may reflect the electric waves, and then affect the resonance of the antenna. Thus, although the monopole antenna 117 is the same as the antenna being installed the outside of the mobile phone 110, it cannot function as an antenna when it is installed within the mobile phone 110.

In this embodiment, in order to solve the problem, an electromagnetic wave absorber 116 is arranged between the antenna 117 and the circuit board 119. Since this electromagnetic wave absorber 116 absorbs electromagnetic wave reflected from the conductive plate constituting the circuit board 119, the interfering effect to the resonance of the antenna is reduced. Thus, the antenna maintains its characteristic inside as well as outside of the mobile phone 110, and the antenna 117 may perform its function well.

The electromagnetic wave absorber 116 absorbs the electromagnetic wave generated from the antenna 117 and the electromagnetic wave generated in the front-side of the mobile phone 110 and propagating toward the user as well. Therefore, the mobile phone according to this embodiment can greatly lower the amount of the electromagnetic wave, i.e. the specific absorption rate (SAR) to which a user is exposed while using or holding the mobile phone.

And, the electromagnetic wave absorber 116 arranged between the circuit board 119 and the antenna 117 prevents deterioration of the performance of the antenna 117 by preventing the circuit board 119 from affecting the resonance of the antenna. Simultaneously, it may decrease the SAR with respect the user by decreasing the amount of the electromagnetic wave emitted from the antenna 117 toward the outside of the mobile phone 110.

The cross-section of the electromagnetic wave radiating element of the antenna 117 is not be limited to a circular shape, and it may have various shapes such as triangle-shape, quadrangle-shape, polygonal-shape, ellipse-shape and the like. Also, the overall structure of the radiating element may have various shapes such as helical, conical, spherical shapes, whichever is adequate to perform the function of an. Antenna 117.

In addition, any materials composed of conducting materials or non-conducting material may be arranged between the housing 111 and the antenna 117, between the antenna 117 and the electromagnetic wave absorber 116, between the electromagnetic wave absorber 116 and the circuit board 119, and between the circuit boards 119 and the housing 111.

The electromagnetic wave absorber 116 is configured to cover the whole antenna 117 when viewed from the front toward the inside of the mobile phone 110. Otherwise, the shape of the electromagnetic wave absorber 116 is not limited. Also, when viewed from the front toward the inside of the mobile phone 110, the electromagnetic wave absorber 116 may have any shape such as circular-shape, triangle-shape, quadrangle-shape, polygon-shape, and ellipse-shape.

The housing 111 of the mobile phone 110 also may have any shape such as a bar-type, a flip-type, and a folder-type.

Figure 4:
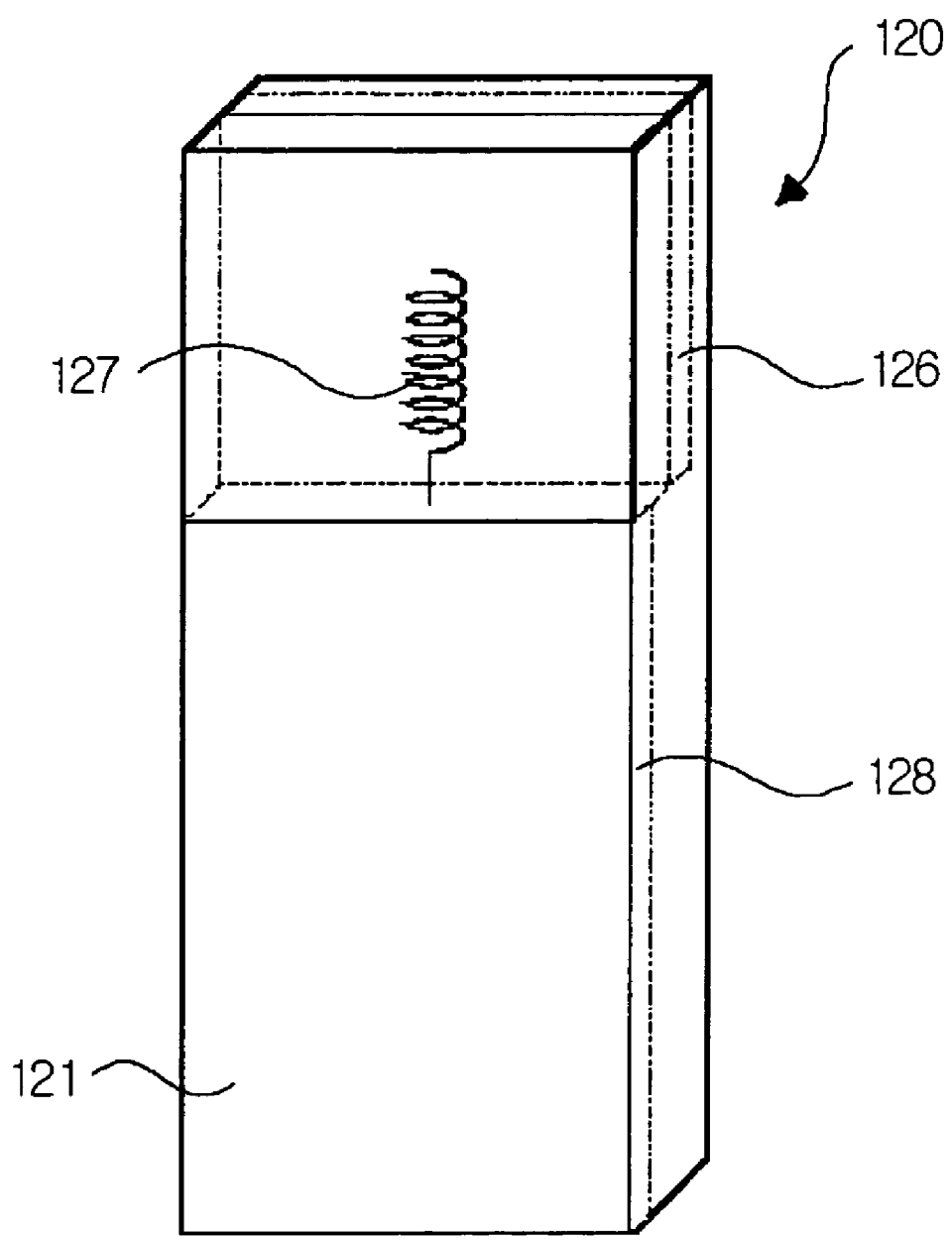
FIG. 4 is a rear view of a mobile phone according to the second embodiment of the present invention.

A mobile phone 120 according to the second embodiment of the present invention shown in FIG. 4 uses an antenna 127 with a radiating element of a helical-type.

The mobile phone 120 according to the second embodiment has the same structure as the mobile phone 110 according to the first embodiment excepting that the antenna 127 has the radiating element of a helical-type. The elements of the mobile phone 120 shown FIG. 4 are designated with reference numerals, which are greater by 10 than those used in FIG. 1 to FIG. 3 to designate the same element, respectively (for example, housing 121 and absorber 126, etc.). In the embodiments explained below, the elements that are not specifically mentioned should be identical or corresponding to the elements of the first embodiment. Thus, explanation on the identical portion of the invention is omitted.

Figure 5:
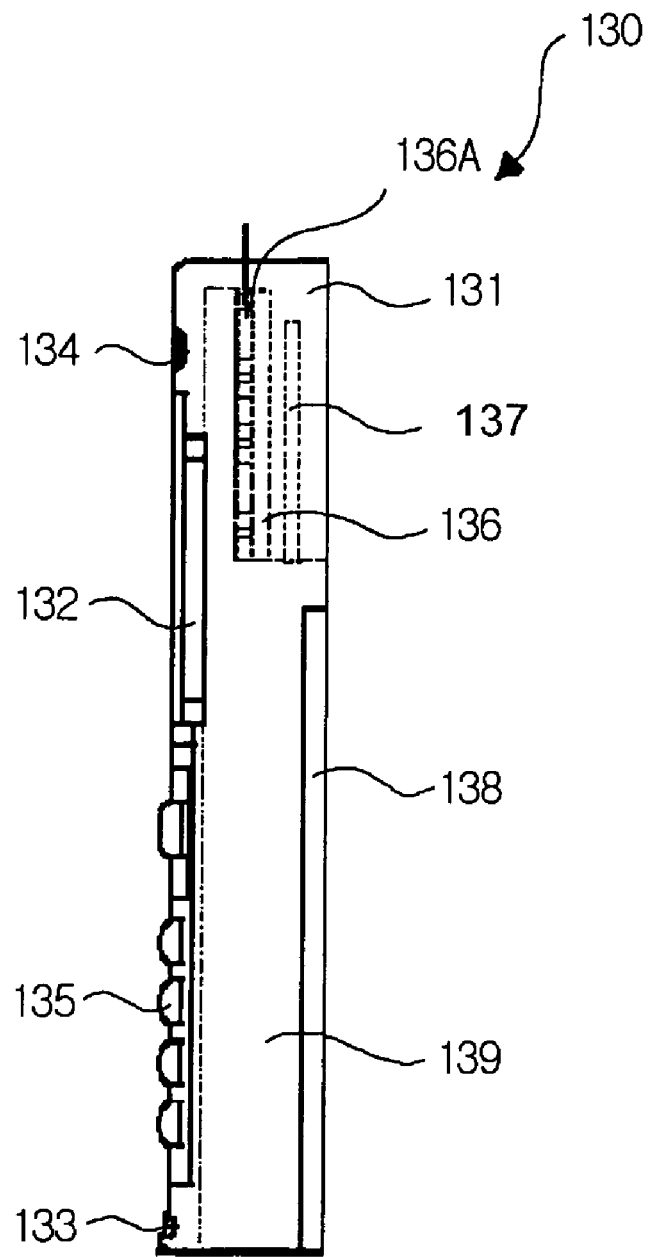
FIG. 5 is a right-side view of a mobile phone according to the third embodiment of the present invention.

A mobile phone 130 according to the third embodiment of the present invention shown in FIG. 5 arranges a conductive plate 136A between a circuit board 139 and an electromagnetic wave absorber 136. The conductive plate 136A functions to shield the electromagnetic wave propagating from the antenna 137 to the head of the user through the electromagnetic wave absorber 136. The mobile phone 130 according to the third embodiment has the same the structure as the mobile phone 110 according to the first embodiment excepting that the conductive plate 136A is arranged between circuit boards 139 and an electromagnetic wave absorber 136. In FIG. 5, reference numerals greater by 20 than used in FIGS. 1–3 are used to designate the elements identical or corresponding to those of the first embodiment, respectively (for example, housing 131 and antenna 137, etc.). Thus, explanation on the portions of the invention identical to the embodiment shown in FIGS. 1 to 3 is omitted.

Figure 6:
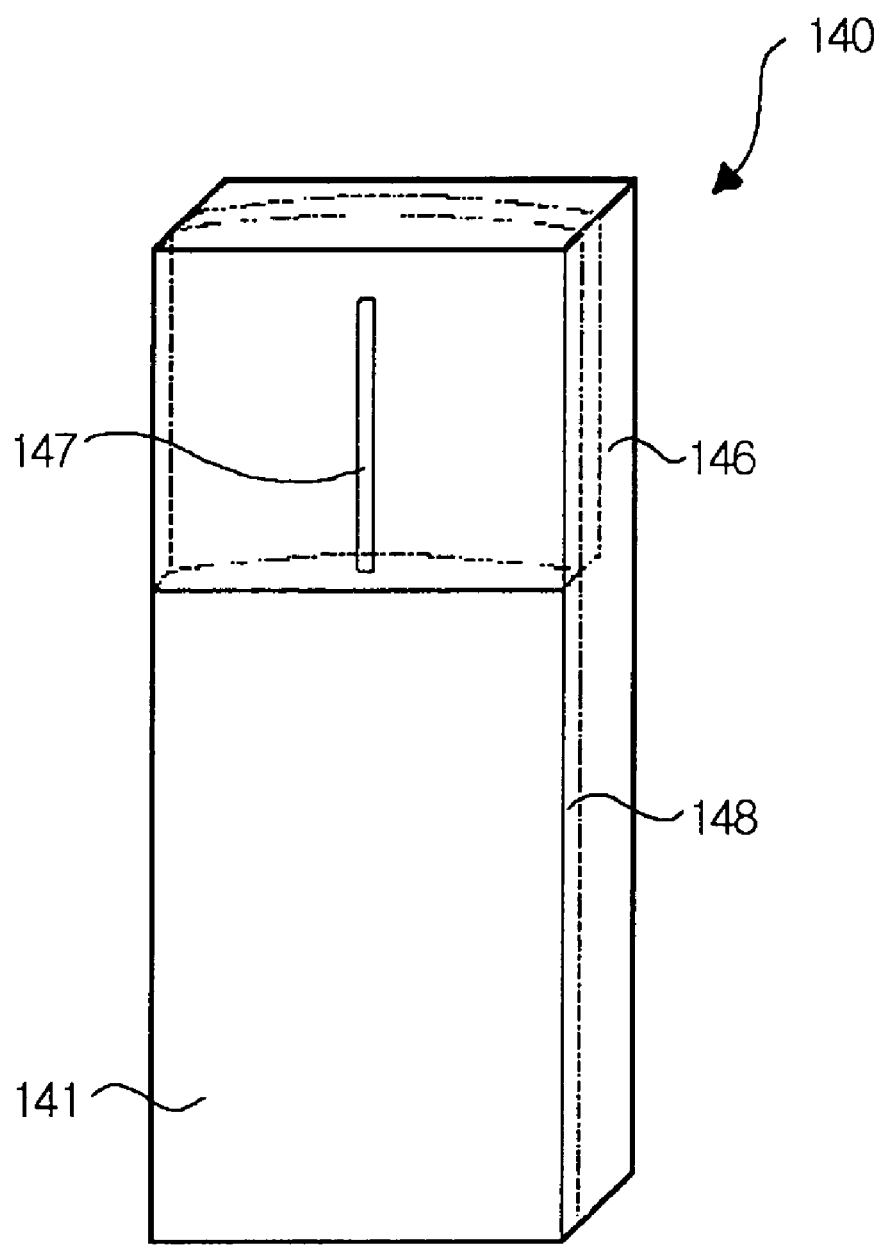
FIG. 6 is a rear view of a mobile phone according to the fourth embodiment of the present invention.

In a mobile phone 140 according to the fourth embodiment of the present invention shown in FIG. 6, the electromagnetic wave absorber 146 has a rectangular shape in the cross section taken along the longitudinal direction of the mobile phone 140, and a convex shape projection toward the front side of the mobile phone in the cross section taken along the lateral direction.

The mobile phone 140 according to the fourth embodiment has the same structure as the mobile phone 110 according to the first embodiment excepting that the electromagnetic wave absorber 146 has a convex shape. In FIG. 6, reference numerals greater by 30 than used in FIGS. 1–3 are used to designate the elements identical or corresponding to those of the first embodiment, respectively (for example, housing 141 and antenna 147, etc.). Thus, explanation on the portions of the invention identical to the embodiment shown in FIGS. 1 to 3 is omitted.

Figure 7:
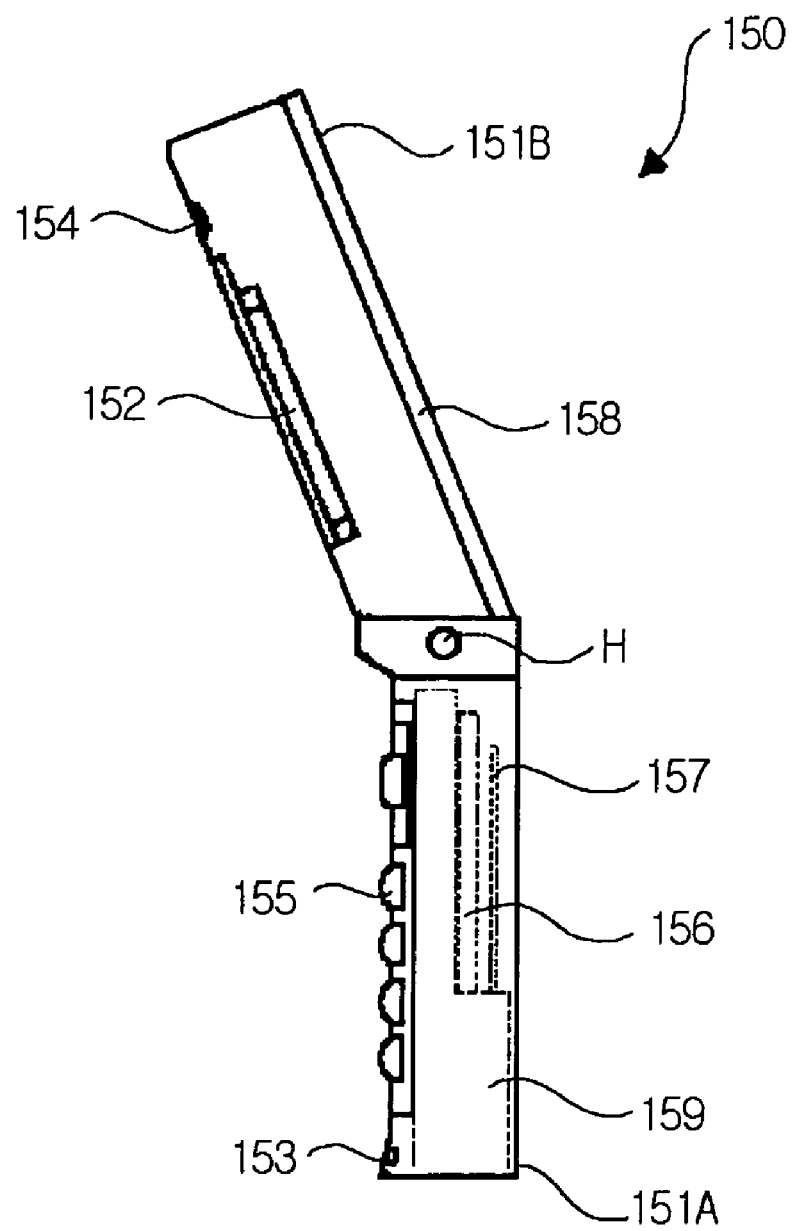
FIG. 7 is a right-side view of a mobile phone according to the fifth embodiment of the present invention.

In a mobile phone 150 according to the fifth embodiment of the present invention shown in FIG. 7, the housing of the mobile phone 150 is a folder-type housing consisting of a main housing member 151A and a sub housing member 151B, which are connected to each other by a hinge H. In this embodiment, said electromagnetic wave absorber 156 and the antenna 157 are installed in the main housing member 151A. Alternatively, said electromagnetic wave absorber 156 and the antenna 157 may be installed in the sub housing member 151B. The mobile phone 150 according to the fifth embodiment has the same as the structure of the mobile phone 110 according to the first embodiment excepting that the housing of the mobile phone 150 is the folder-type housing consisting of a main housing member 151A and a sub housing member 151B which are connected to each other by a hinge H so that they may be folded and opened about the hinge H. In FIG. 7, reference numerals greater by 40 than used in FIGS. 1–3 are used to designate the elements identical or corresponding to those of the first embodiment, respectively (for example, display device 152 and keypad 155, etc.). Thus, explanation on the portions of the invention identical to the embodiment shown in FIGS. 1 to 3 is omitted.

Figure 8:
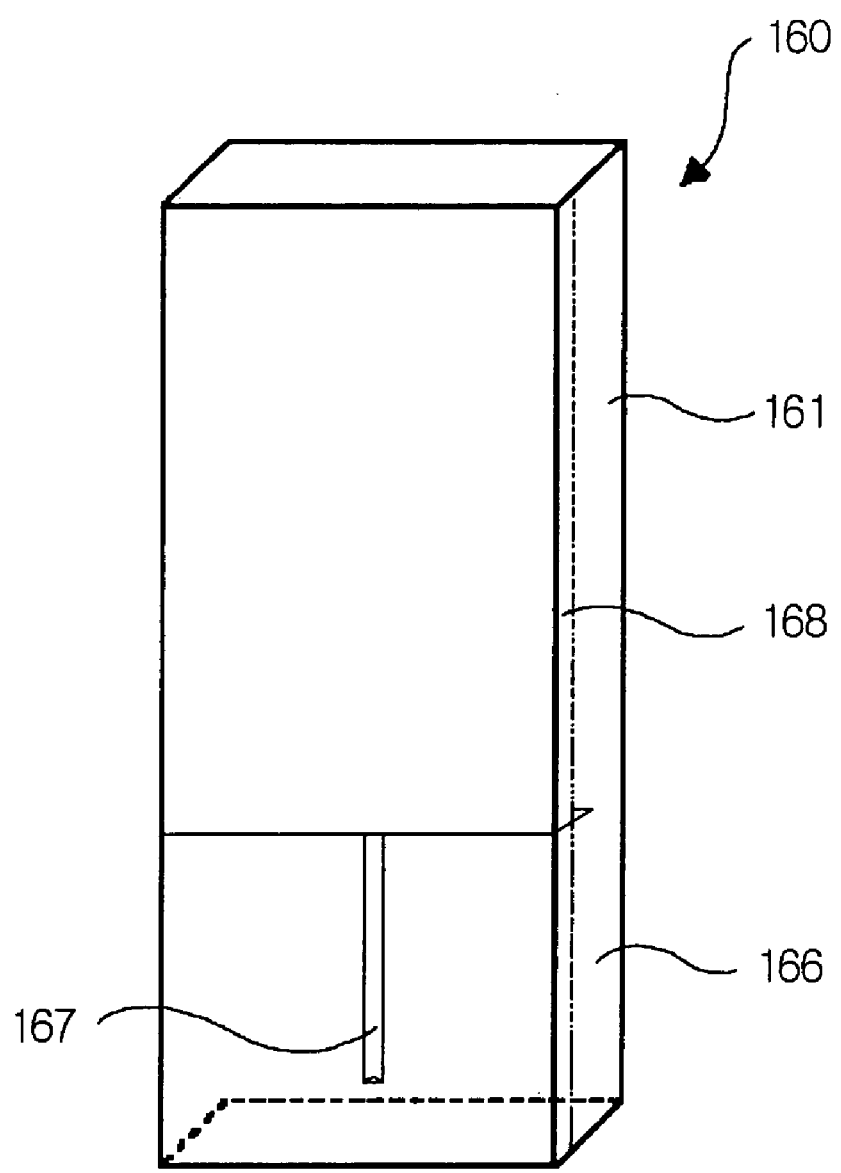
FIG. 8 is a rear view of a mobile phone according to the sixth embodiment of the present invention.

In a mobile phone 160 according to the sixth embodiment of the present invention shown in FIG. 8, an electromagnetic wave absorber 166 and an antenna 167 are arranged adjacent to the bottom of the housing 161 of the mobile phone 160. The mobile phone 160 according to the sixth embodiment has the same structure as the mobile phone 110 according to the first embodiment excepting for the position f the electromagnetic wave absorber 166 and the antenna 167. In FIG. 8, reference numerals greater by 50 than used in FIGS. 1–3 are used to designate the elements identical or corresponding to those of the first embodiment, respectively. Thus, explanation on the portions of the invention identical to the embodiment shown in FIGS. 1 to 3 is omitted.

Figure 9:
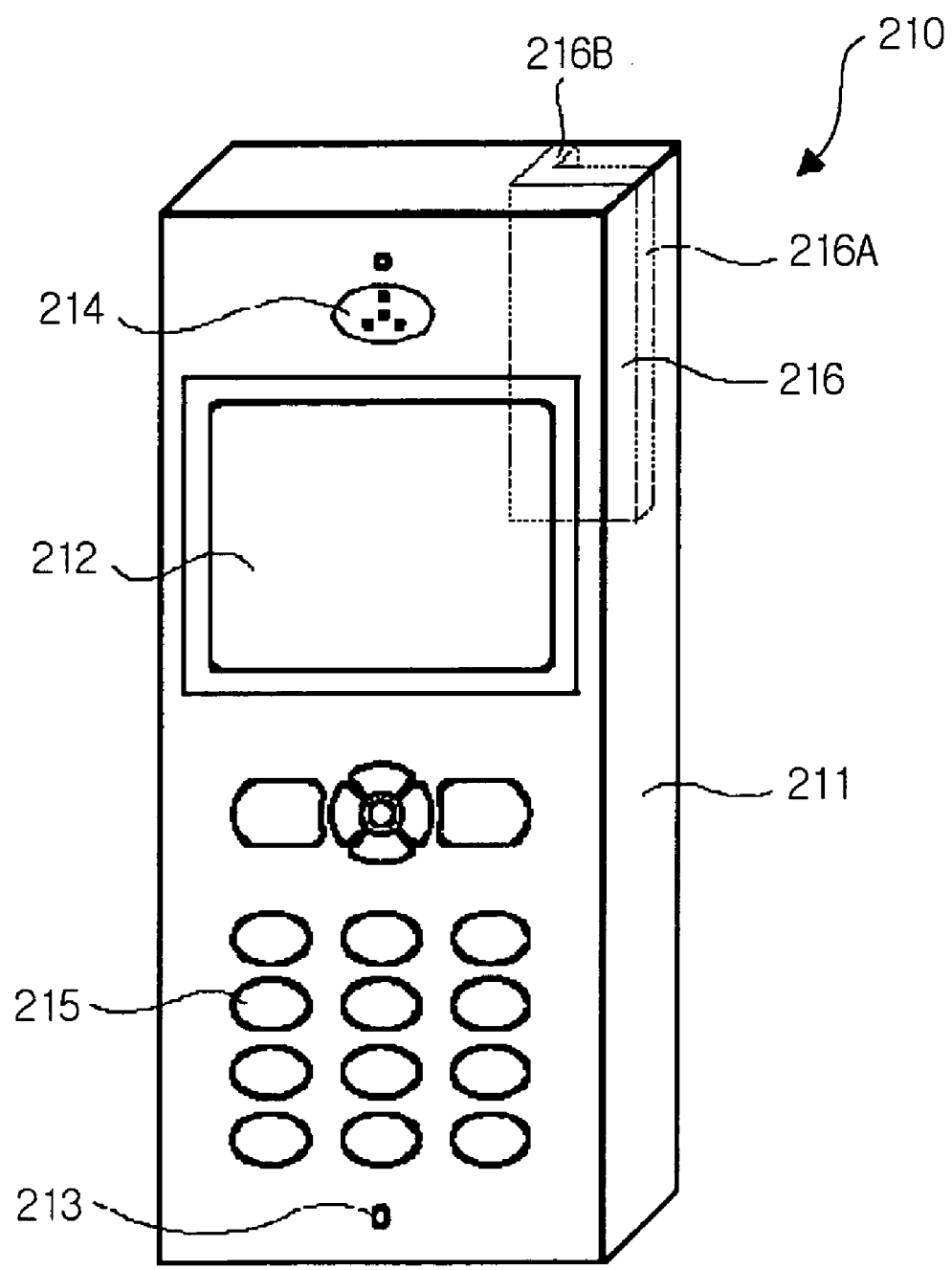
FIG. 9 is a front view of a mobile phone according to the seventh embodiment of the present invention.
Figure 10:
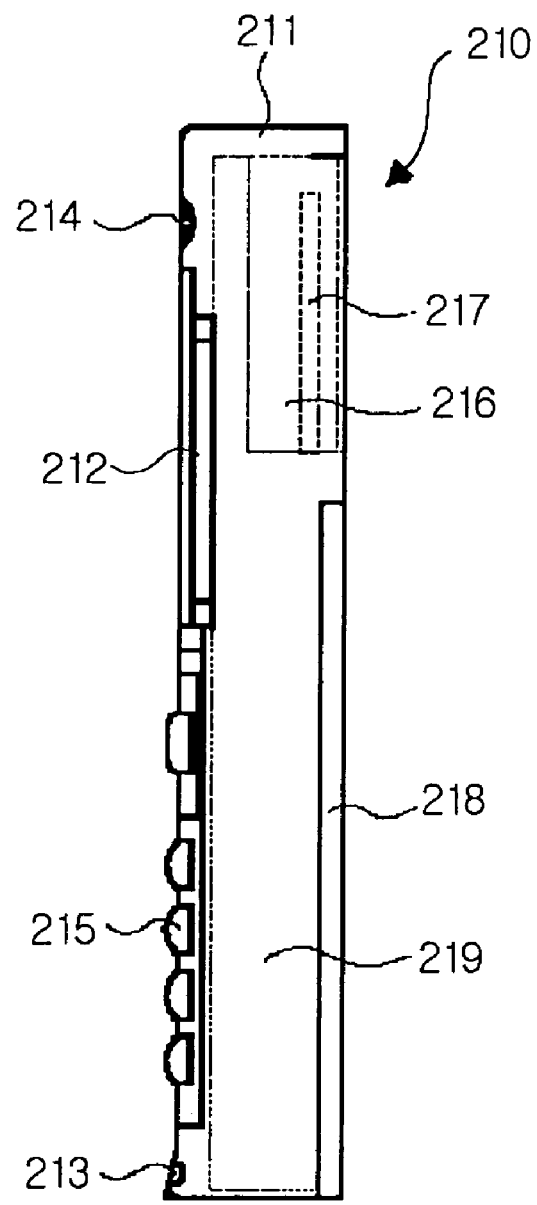
FIG. 10 is a right-side view of a part of the interior components of the mobile phone shown in FIG. 9.
Figure 11:
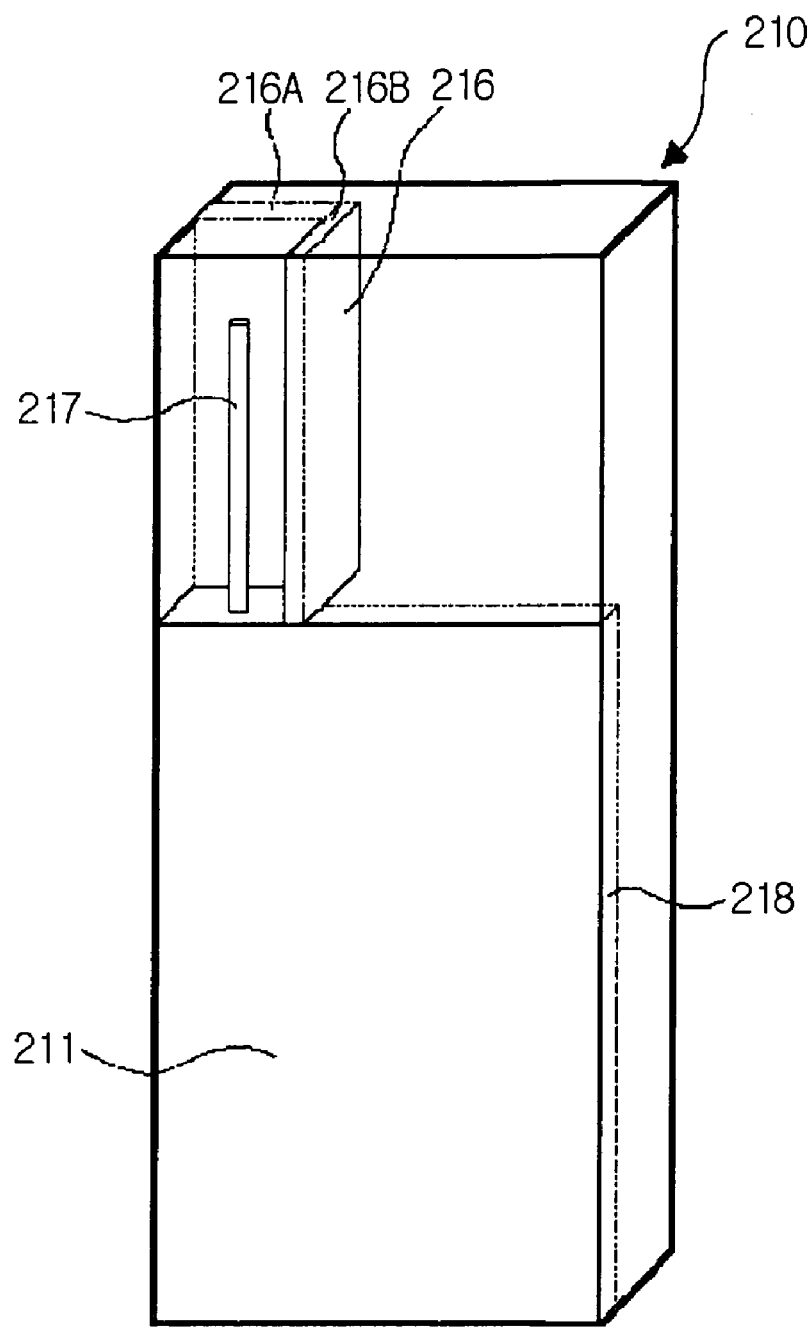
FIG. 11 is a rear view of the mobile phone shown in FIG. 9.

FIG. 9 to FIG. 11 illustrates a structure of a mobile phone according to the seventh embodiment of the present invention.

In the seventh embodiment, a mobile phone 210 has the same structure as the mobile phone 110 according to the first embodiment excepting that the position and shape of the electromagnetic wave absorber 216 of a mobile phone 210 is different from those of the first embodiment. In this embodiment, the electromagnetic wave absorber 216 has a L-shape in the lateral cross section. The electromagnetic wave absorber 216 consists of two walls of a first wall 216A and a second wall 216B joining each other at an angle of 90°, and the first wall 216A is attached to a circuit board 219. And, from one side of the first wall 216A, the second wall 216B is extended toward the rear wall of the housing 211, and other side of the first wall 216A adjoins the right-side wall of the housing 211 viewing from the front-side of the mobile phone 210. An antenna 217 is arranged in the inside of a square space formed by the two walls of the electromagnetic wave absorber 216 and the right-side and rear walls of the housing 211.

Figure 12:
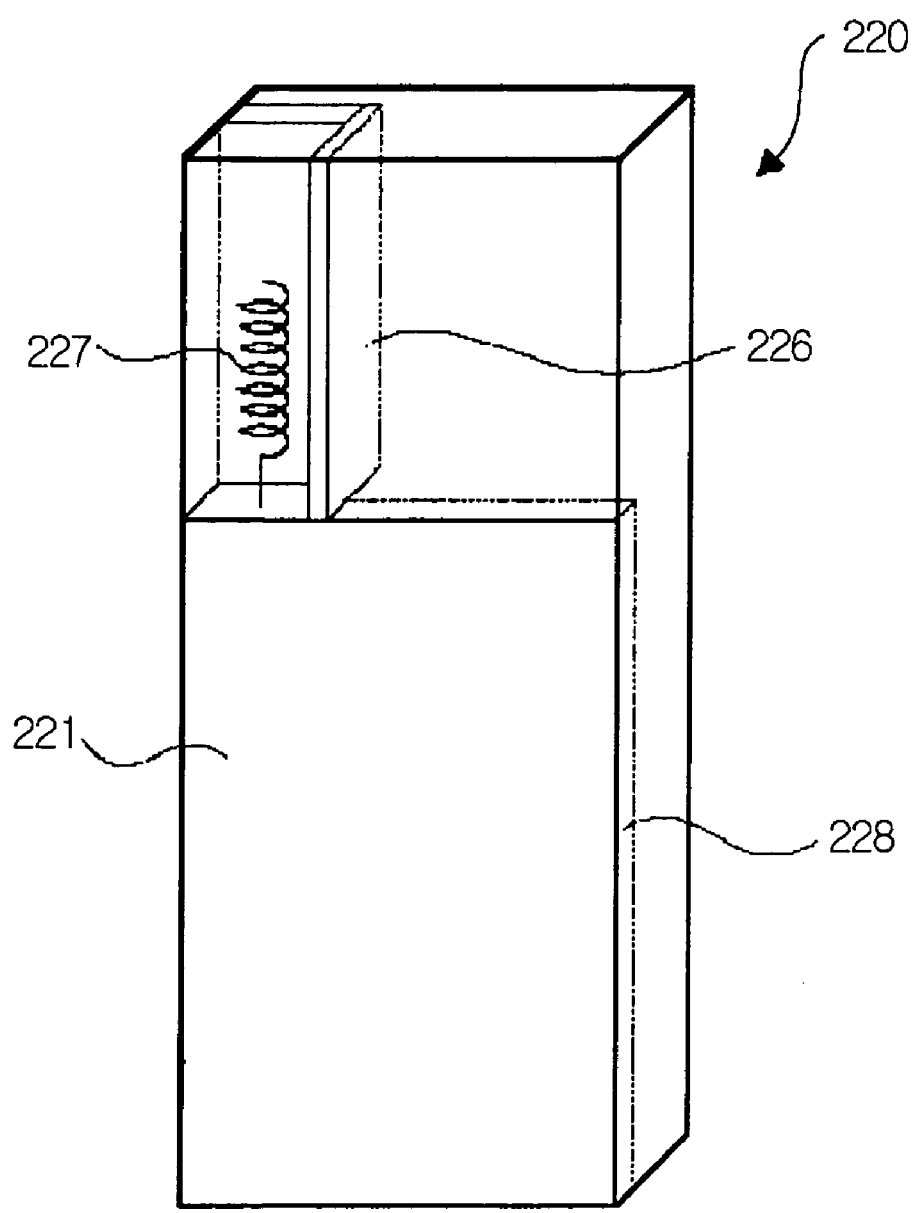
FIG. 12 is a rear view of a mobile phone according to the eighth embodiment of the present invention.

A mobile phone 220 according to the eighth embodiment of the present invention shown in FIG. 12 uses an antenna 227 with helical-type radiating element.

The mobile phone 220 according to the eighth embodiment has the same structure as the mobile phone 210 according to the seventh embodiment excepting that the antenna 227 has a helical-type radiating element. In FIG. 12, reference numerals greater by 10 than used in FIGS. 9 to 11 are used to designate the elements identical or corresponding to the elements of the seventh embodiment, respectively. Thus, explanation on the portions identical to the embodiment shown in FIGS. 9 to 11 will be referred to the corresponding explanation relating to the seventh embodiment and omitted hereinafter.

Figure 13:
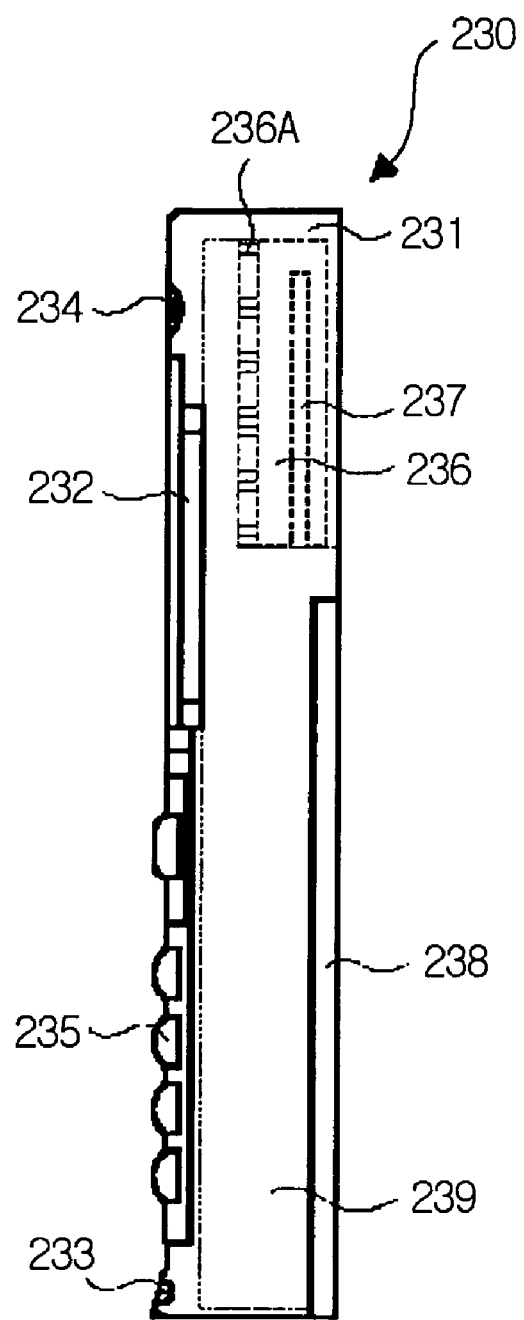
FIG. 13 is a right-side view of a mobile phone according to the ninth embodiment of the present invention.

A mobile phone 230 according to the ninth embodiment of the present invention shown in FIG. 13 arranges a conductive plate 236A between a circuit board 239 and an electromagnetic wave absorber 236. The conductive plate 236A functions to shield electromagnetic wave propagating from the antenna toward the user's head via the electromagnetic wave absorber 236.

The mobile phone 230 according to the eighth embodiment has the same structure as the mobile phone 210 according to the seventh embodiment excepting that the conductive plate 236A is arranged between the circuit board 239 and the electromagnetic wave absorber 236. In FIG. 13, reference numerals greater by 20 than used in FIGS. 9 to 11 are used to designate the elements identical or corresponding to the elements of the seventh embodiment, respectively. Thus, explanation on the portions identical to the embodiment shown in FIGS. 9 to 11 will be referred to the corresponding explanation relating to the seventh embodiment and omitted hereinafter.

Figure 14:
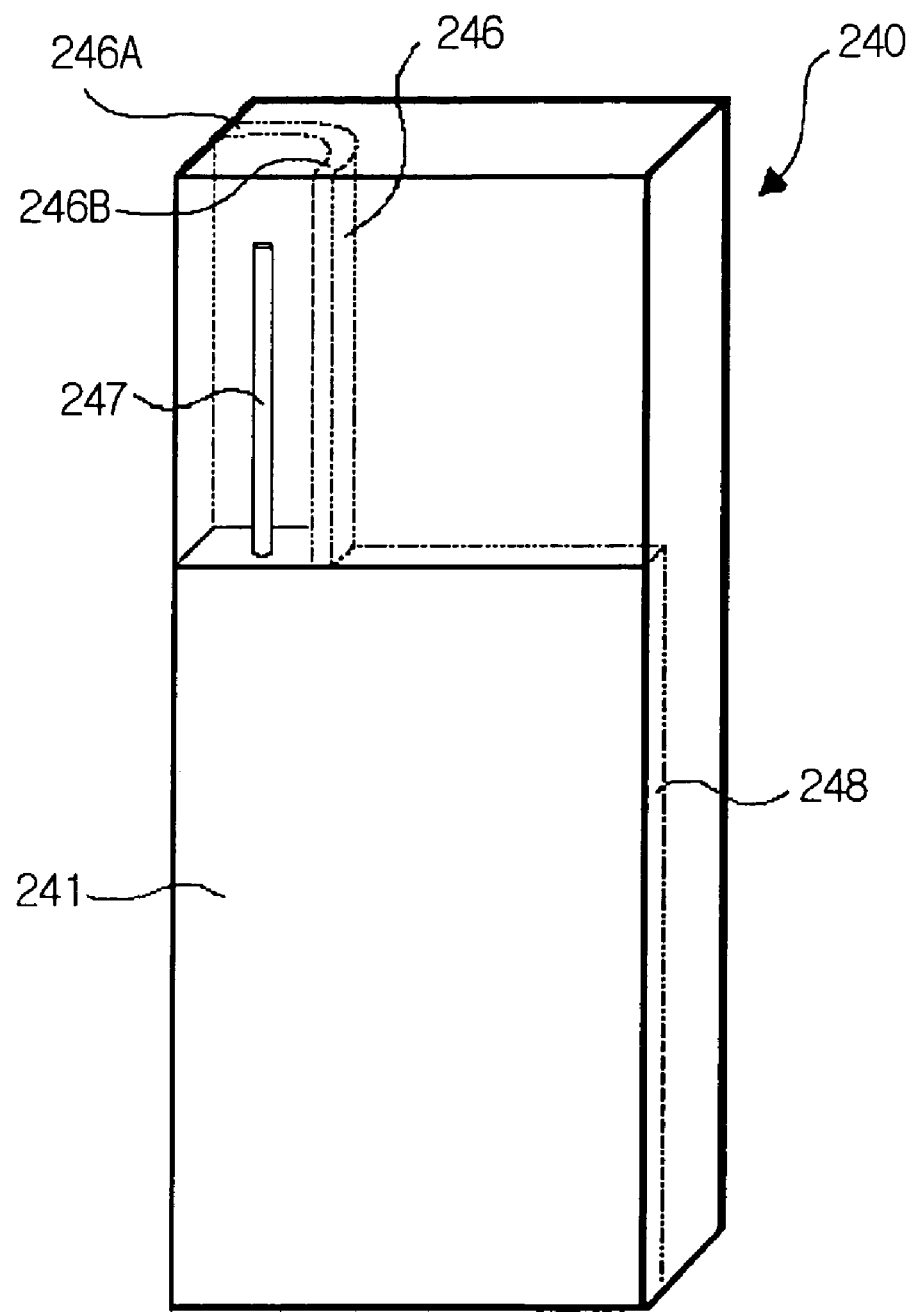
FIG. 14 is a rear view of a mobile phone according to the tenth embodiment of the present invention.

In a mobile phone 240 according to the tenth embodiment of the present invention shown in FIG. 14, the electromagnetic wave absorber 246 has a rounded L shape in the lateral cross section of the mobile phone 240. That is, the first wall 246A and the second wall 246B are arranged at an angle of 90°, but the edged where the first wall 246A and the second wall 246B meet with each other is rounded.

The mobile phone 240 according to the tenth embodiment has the same structure as the mobile phone 210 according to the seventh embodiment excepting that the shape of the electromagnetic wave absorber 246 in the lateral cross section of the mobile phone. In FIG. 14, reference numerals greater by 30 than used in FIGS. 9 to 11 are used to designate the elements identical or corresponding to the elements of the seventh embodiment, respectively. Thus, explanation on the portions identical to the embodiment shown in FIGS. 9 to 11 will be referred to the corresponding explanation relating to the seventh embodiment and omitted hereinafter.

Figure 15:
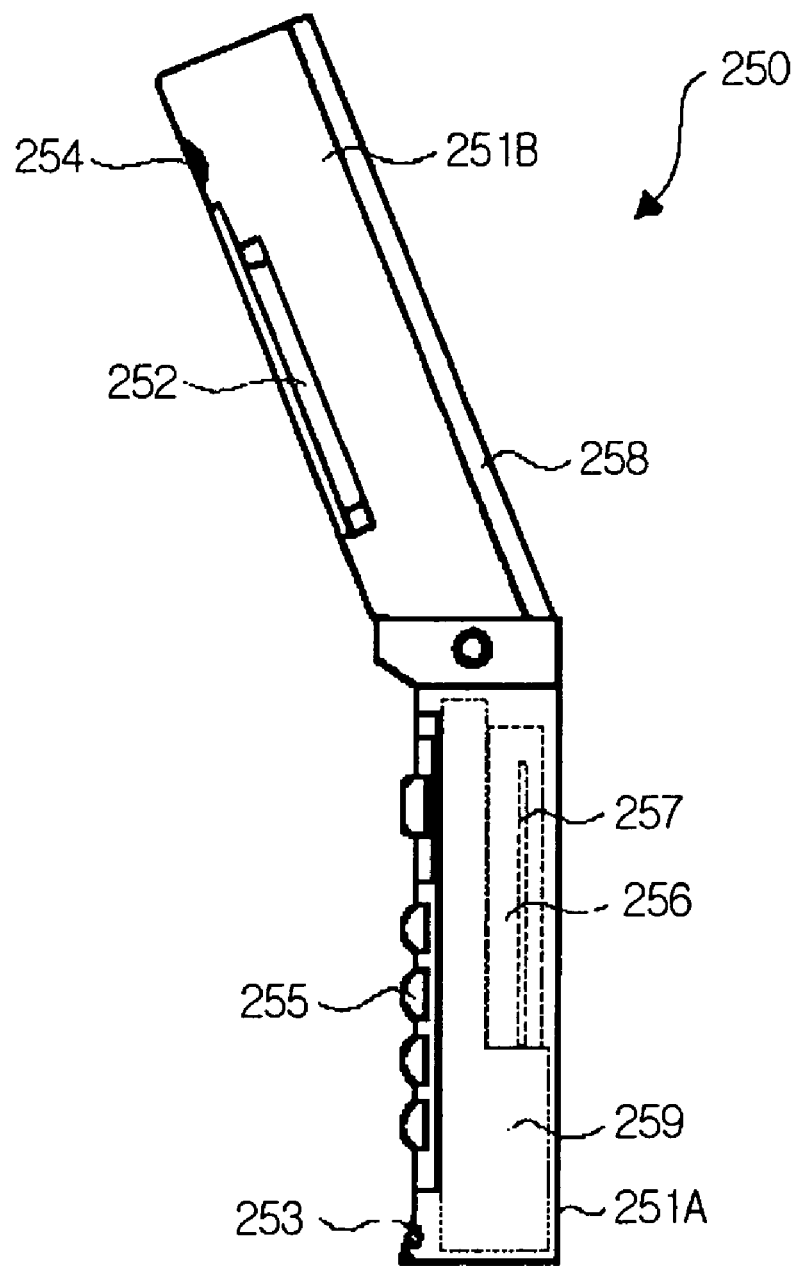
FIG. 15 is a right-side view of a mobile phone according to the eleventh embodiment of the present invention.

In a mobile phone 250 according to the eleventh embodiment of the present invention shown in FIG. 15, a folder-type housing consisting of a main housing member 251A and a sub housing member 251B which are connected to each other via a hinge. In this embodiment, an electromagnetic wave absorber 256 and an antenna 257 are installed in the main housing member 251A. Alternatively, the electromagnetic wave absorber 256 and the antenna 257 may be installed in the sub housing member 251B.

The mobile phone 250 according to the eleventh embodiment has the same structure as the mobile phone 210 according to the seventh embodiment excepting that the housing of the mobile phone 250 is a folder-type housing composed of the main housing member 251A and the sub housing member 251B which are connected to each other by a hinge. In FIG. 15, reference numerals greater by 40 than used in FIGS. 9 to 11 are used to designate the elements identical or corresponding to the elements of the seventh embodiment, respectively. Thus, explanation on the portions identical to the embodiment shown in FIGS. 9 to 11 will be referred to the corresponding explanation relating to the seventh embodiment and omitted hereinafter.

Figure 16:
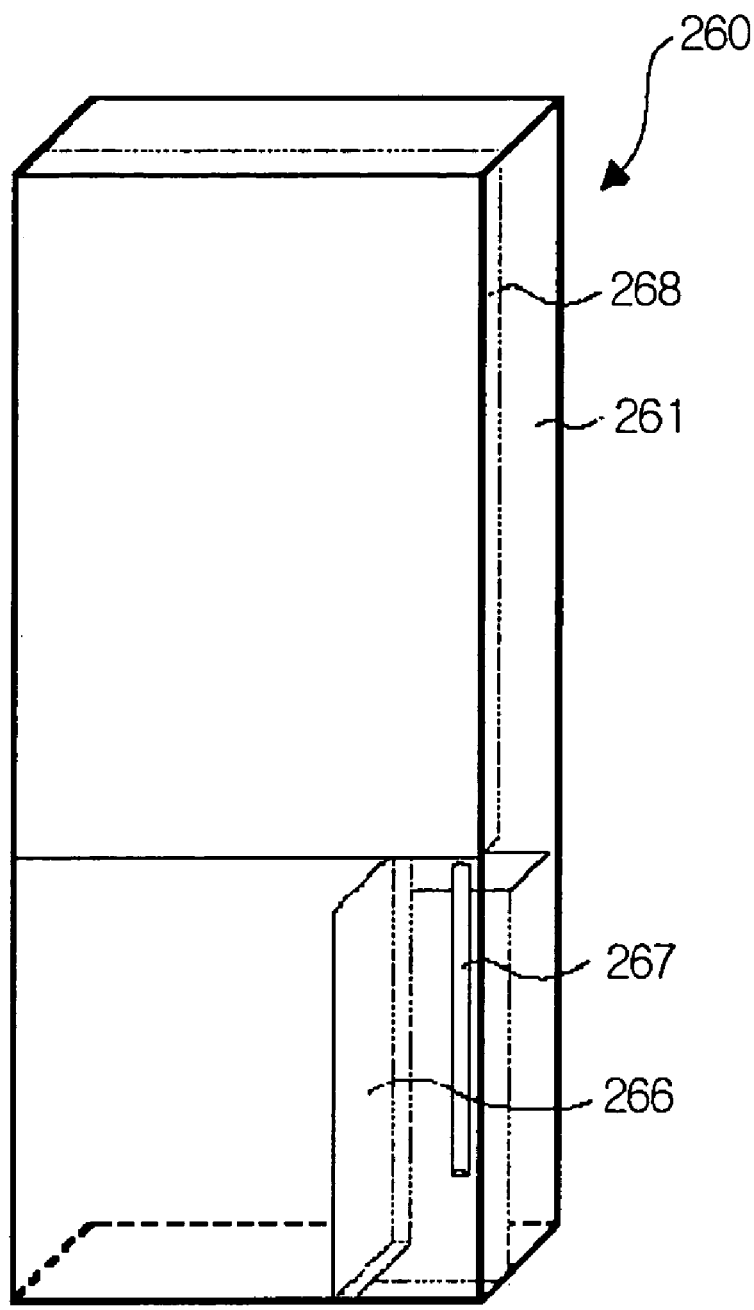
FIG. 16 is a rear view of a mobile phone according to the twelfth embodiment of the present invention.

In a mobile phone 260 according to the twelfth embodiment of the present invention shown in FIG. 16, an electromagnetic wave absorber 266 and an antenna 267 are arranged adjacent to a lower-right corner of the housing 261 of the mobile phone 260 in a rear view of the mobile phone 260.

The mobile phone 260 according to the twelfth embodiment has the same structure as the mobile phone 210 according to the seventh embodiment excepting for the positions of the electromagnetic wave absorber 266 and the antenna 267. In FIG. 16, reference numerals greater by 50 than used in FIGS. 9 to 11 are used to designate the elements identical or corresponding to the elements of the seventh embodiment, respectively. Thus, explanation on the portions identical to the embodiment shown in FIGS. 9 to 11 will be referred to the corresponding explanation relating to the seventh embodiment and omitted hereinafter.

Figure 17:
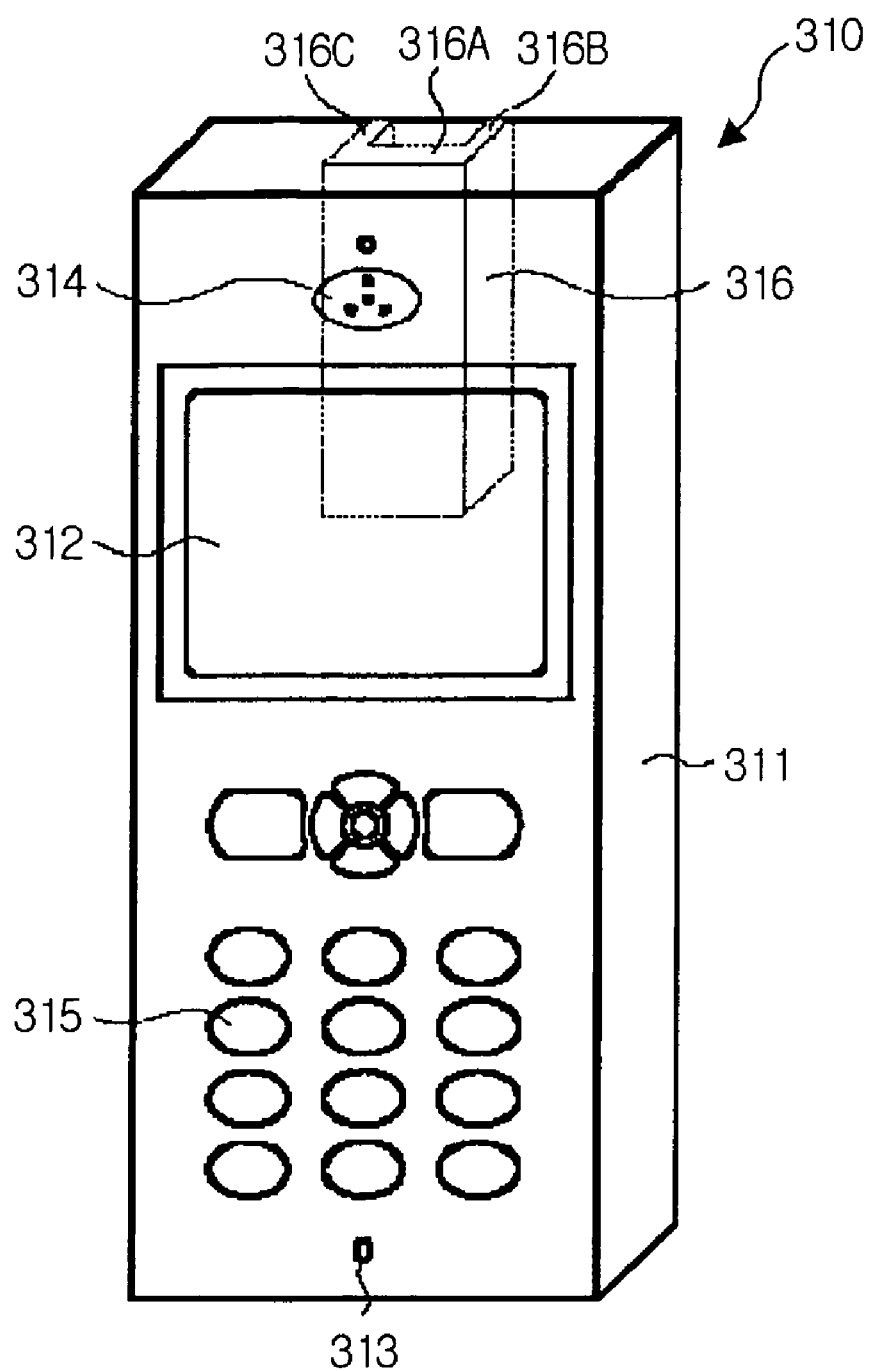
FIG. 17 is a front view of a mobile phone according to the thirteenth embodiment of the present invention.
Figure 18:
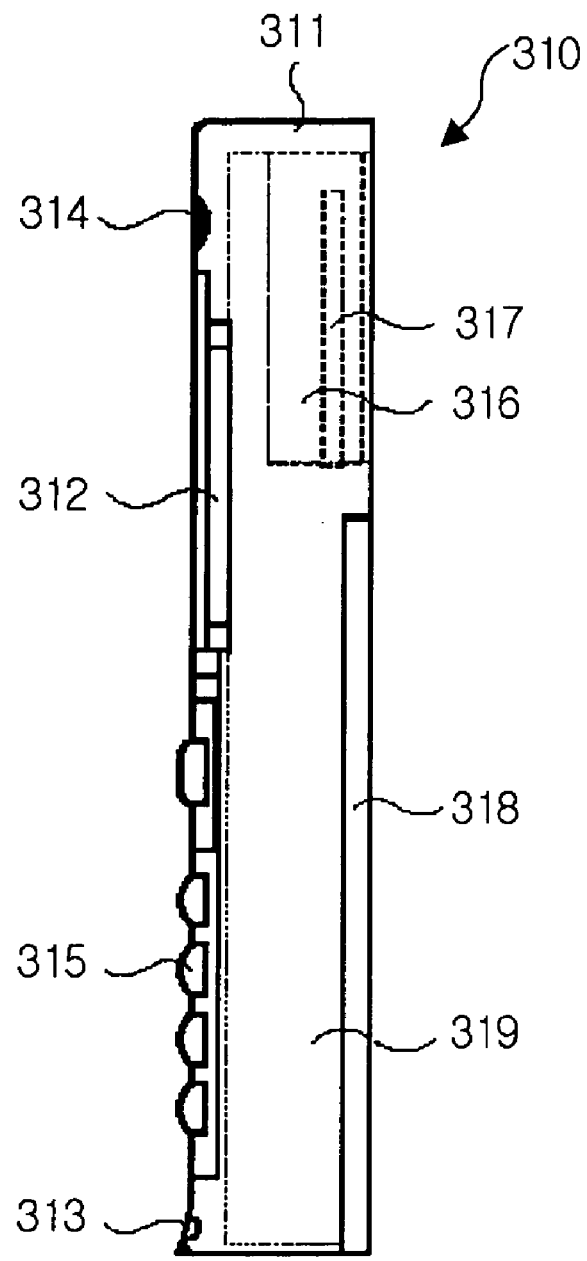
FIG. 18 is a right-side view of the mobile phone shown in FIG. 17.
Figure 19:
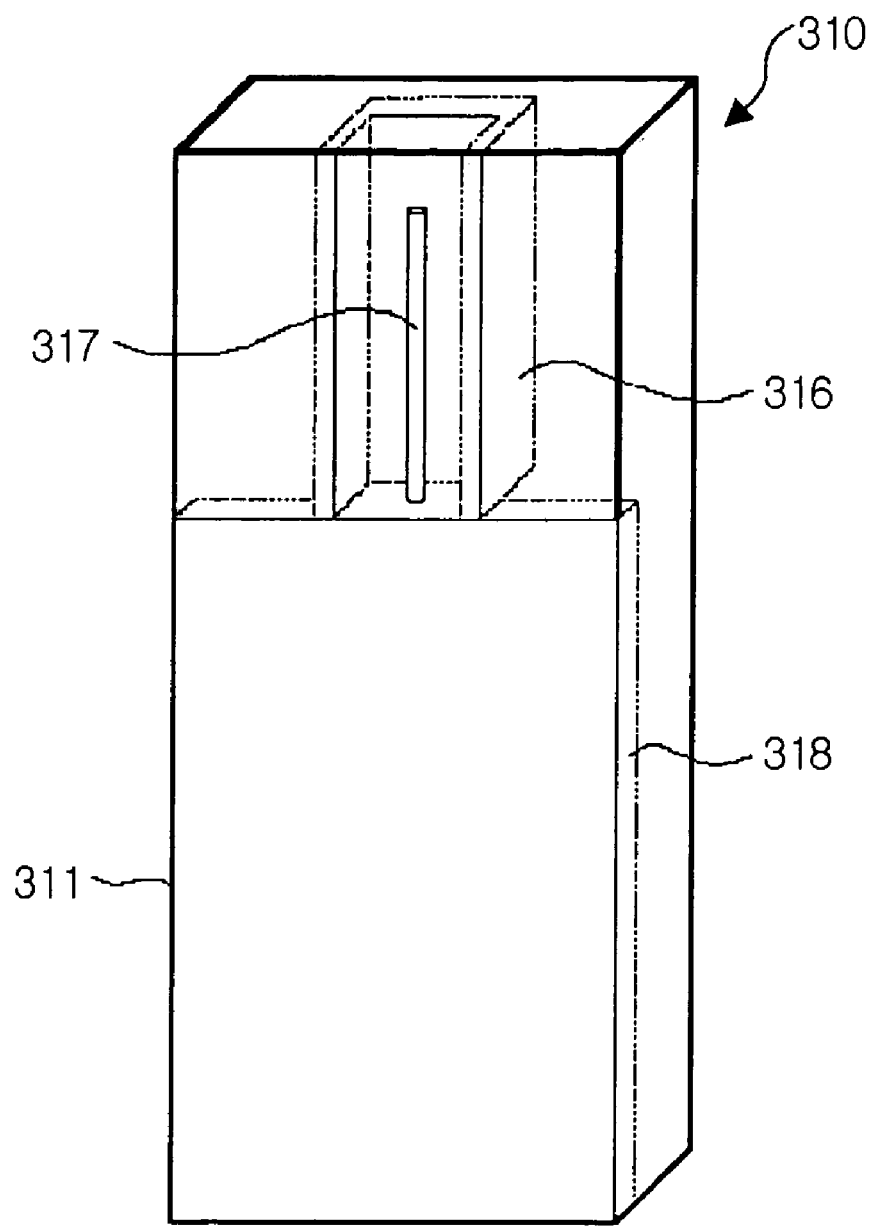
FIG. 19 is a rear view of the mobile phone shown in FIG. 17.

FIG. 17 to FIG. 19 illustrates a structure of a mobile phone according to the thirteenth embodiment of the present invention.

In this embodiment, a mobile phone 310 has the same structure as the mobile phone 110 according to the first embodiment excepting that the position and the shape of an electromagnetic wave absorber 316 is different from those of the first embodiment. Therefore, explanation for the structures other than the electromagnetic wave absorber 316 is referred to the explanation relating to the first embodiment.

In the electromagnetic wave absorber 316 according to this embodiment, the outer surface of a bottom part 316A is attached to a circuit board 319, and a pair of side-walls 316B, 316C formed at both sides of the bottom part 316A are provided to form a shape of elongated channel protruding from the circuit board 319. In this embodiment, the cross-section of the electromagnetic wave absorber 316 has an angled U-shape. Preferably, the bottom part 316A and the side-walls 316B, 316C make an angle of 90°. An antenna 317 having a shape of elongated pipe is arranged in the electromagnetic wave absorber 316. The opening of the electromagnetic wave absorber 316 preferable makes an angle of 90° to 180° with respect to the antenna 317 arranged in the electromagnetic wave absorber 316. Also, in assembled mobile phone 310, the opening of the electromagnetic wave absorber 316 is preferably closed by at least one surface of the housing 311. In this embodiment, the opening is closed by the rear wall of the housing 311.

Figure 20:
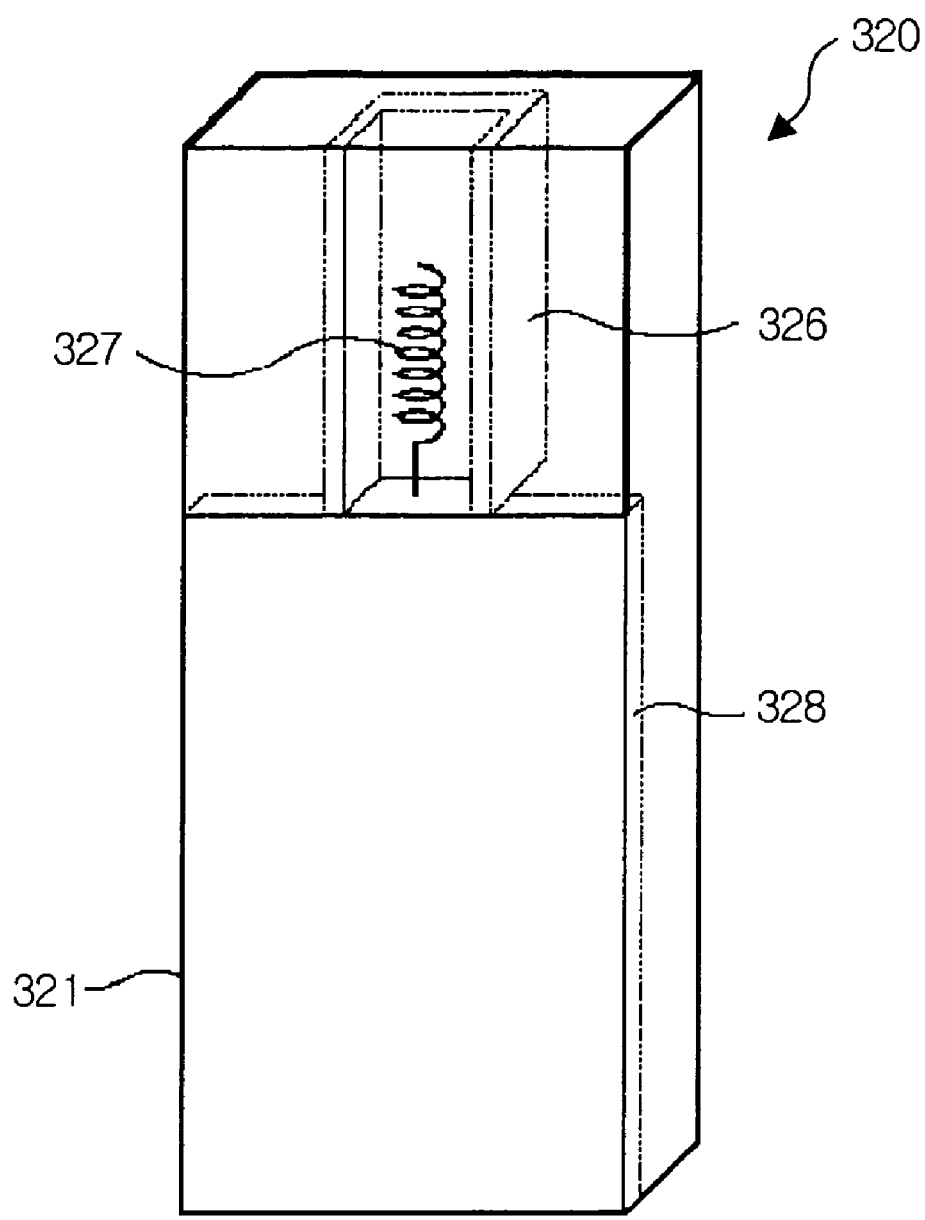
FIG. 20 is a rear view of a mobile phone according to the fourteenth embodiment of the present invention.

A mobile phone 320 according to the fourteenth embodiment of the present invention shown in FIG. 20 uses an antenna 327 having a helical-type radiating element.

The mobile phone 320 according to the fourteenth embodiment has the same structure as the mobile phone 310 according to the thirteenth embodiment excepting that the antenna 327 has a helical-type radiating element. In FIG. 20, reference numerals greater by 10 than used in FIGS. 17 to 19 are used to designate the elements identical or corresponding to the elements of the 13th embodiment, respectively. Thus, explanation on the portions identical to the embodiment shown in FIGS. 17 to 19 will be referred to the corresponding explanation relating to the 13th embodiment and omitted hereinafter.

Figure 21:
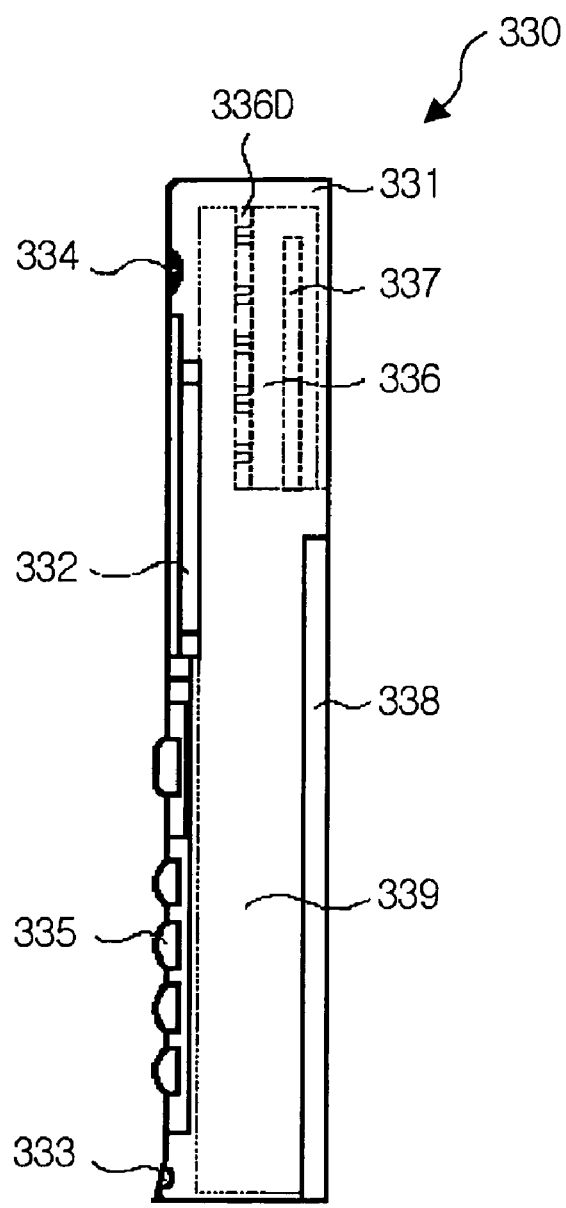
FIG. 21 is a right-side view of a mobile phone according to the fifteenth embodiment of the present invention.

A mobile phone 330 according to the 15th embodiment of the present invention shown in FIG. 21 arranges a conductive plate 336D between a circuit board 339 and an electromagnetic wave absorber 336. The conductive plate 336D functions to shield the electromagnetic wave radiated to a user through the electromagnetic wave absorber 336 from the antenna 337.

The mobile phone 330 according to the 15th embodiment has the same structure as the mobile phone 310 according to the 13th embodiment excepting that the conductive plate 336D is arranged between the circuit board 339 and the electromagnetic wave absorber 336. In FIG. 21, reference numerals greater by 20 than used in FIGS. 17 to 19 are used to designate the elements identical or corresponding to the elements of the 13th embodiment, respectively. Thus, explanation on the portions identical to the embodiment shown in FIGS. 17 to 19 will be referred to the corresponding explanation relating to the 13th embodiment and omitted hereinafter.

Figure 22:
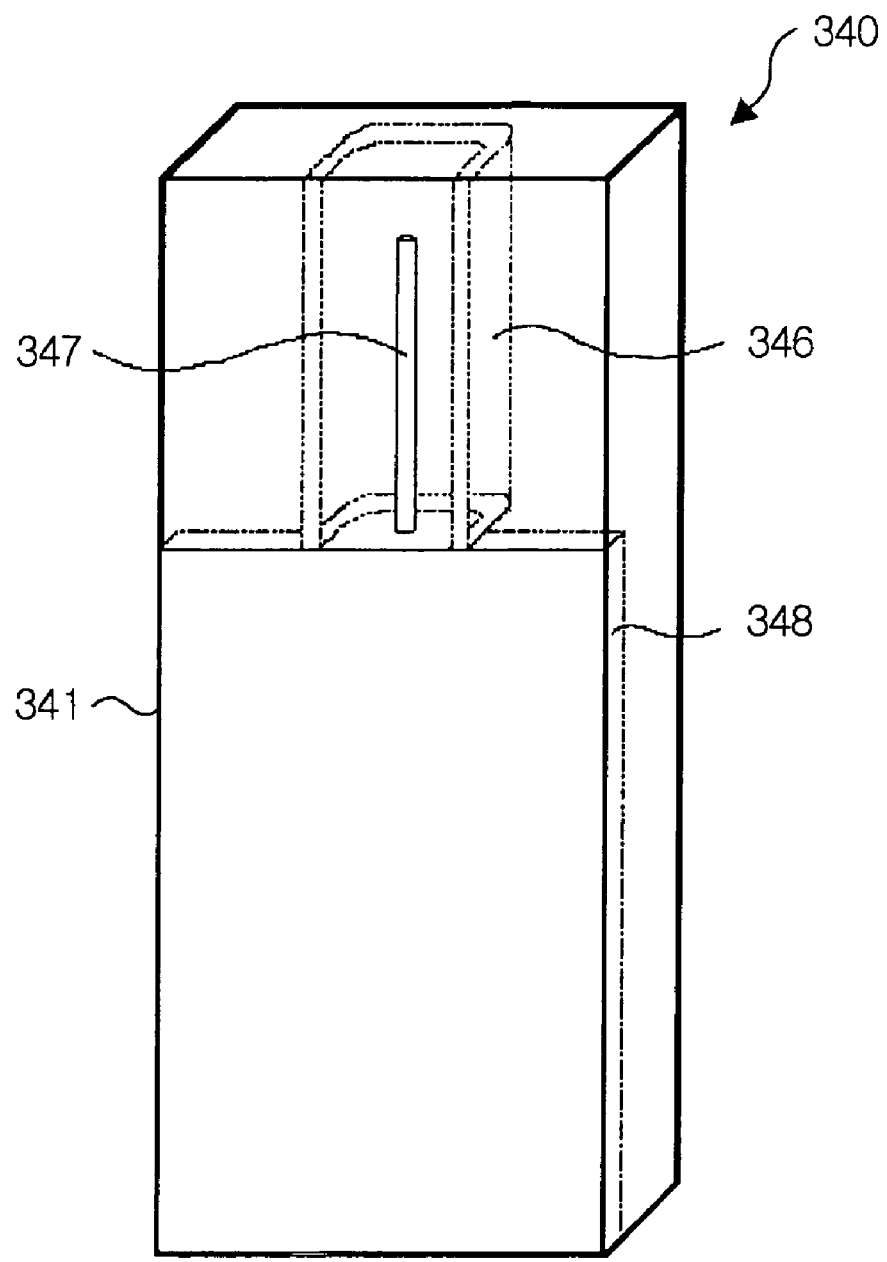
FIG. 22 is a rear view of a mobile phone according to the sixteenth embodiment of the present invention.

In a mobile phone 340 according to the 16th embodiment of the present invention shown in FIG. 22, the cross-section of an electromagnetic wave absorber 346 taken along the lateral-direction of the mobile phone 240 has a rounded U-shape. That is, the bottom part 346A and the side walls 346B, 346C are arranged to make an angle of 90°, but the edges where the bottom part 346A and the side walls 346B, 346C meet with each other are rounded.

The mobile phone 340 according to the sixteenth embodiment has the same structure as the mobile phone 310 according to the thirteenth embodiment excepting that the cross-section of the electromagnetic wave absorber 346 taken along the lateral-direction of the mobile phone 340 is a rounded U-shape. In FIG. 22, reference numerals greater by 30 than used in FIGS. 17 to 19 are used to designate the elements identical or corresponding to the elements of the 13th embodiment, respectively. Thus, explanation on the portions identical to the embodiment shown in FIGS. 17 to 19 will be referred to the corresponding explanation relating to the 13th embodiment and omitted hereinafter.

Figure 23:
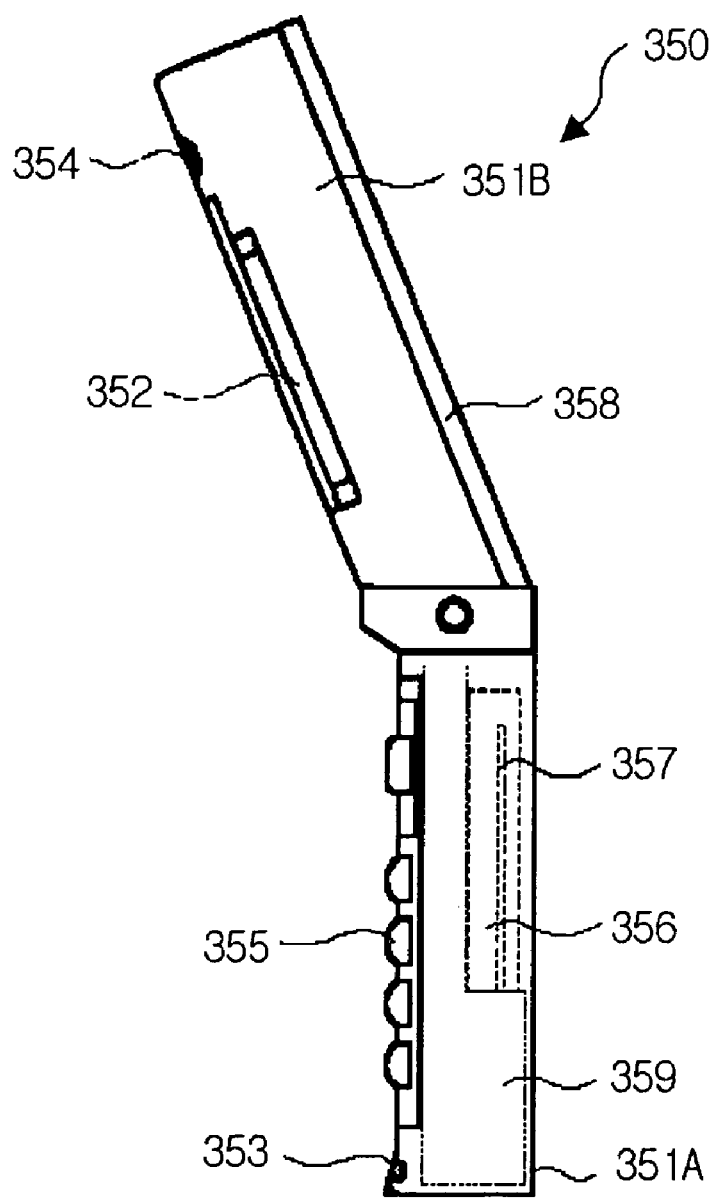
FIG. 23 is a right-side view of a mobile phone according to the seventeenth embodiment of the present invention.

In a mobile phone 350 according to the eleventh embodiment of the present invention shown in FIG. 23, a folder-type housing consisting of a main housing member 351A and a sub housing member 351B which are connected to each other via a hinge. In this embodiment, an electromagnetic wave absorber 356 and an antenna 357 are installed in the main housing member 351A. Alternatively, the electromagnetic wave absorber 356 and the antenna 357 may be installed in the sub housing member 351B.

The mobile phone 350 according to the 17th embodiment has the same structure as the mobile phone 310 according to the 13th embodiment excepting that the housing of the mobile phone 350 is a folder-type housing composed of the main housing member 351A and the sub housing member 351B which are connected to each other by a hinge. In FIG. 23, reference numerals greater by 40 than used in FIGS. 17 to 19 are used to designate the elements identical or corresponding to the elements of the 13th embodiment, respectively. Thus, explanation on the portions identical to the embodiment shown in FIGS. 17 to 19 will be referred to the corresponding explanation relating to the 13th embodiment and omitted hereinafter.

Figure 24:
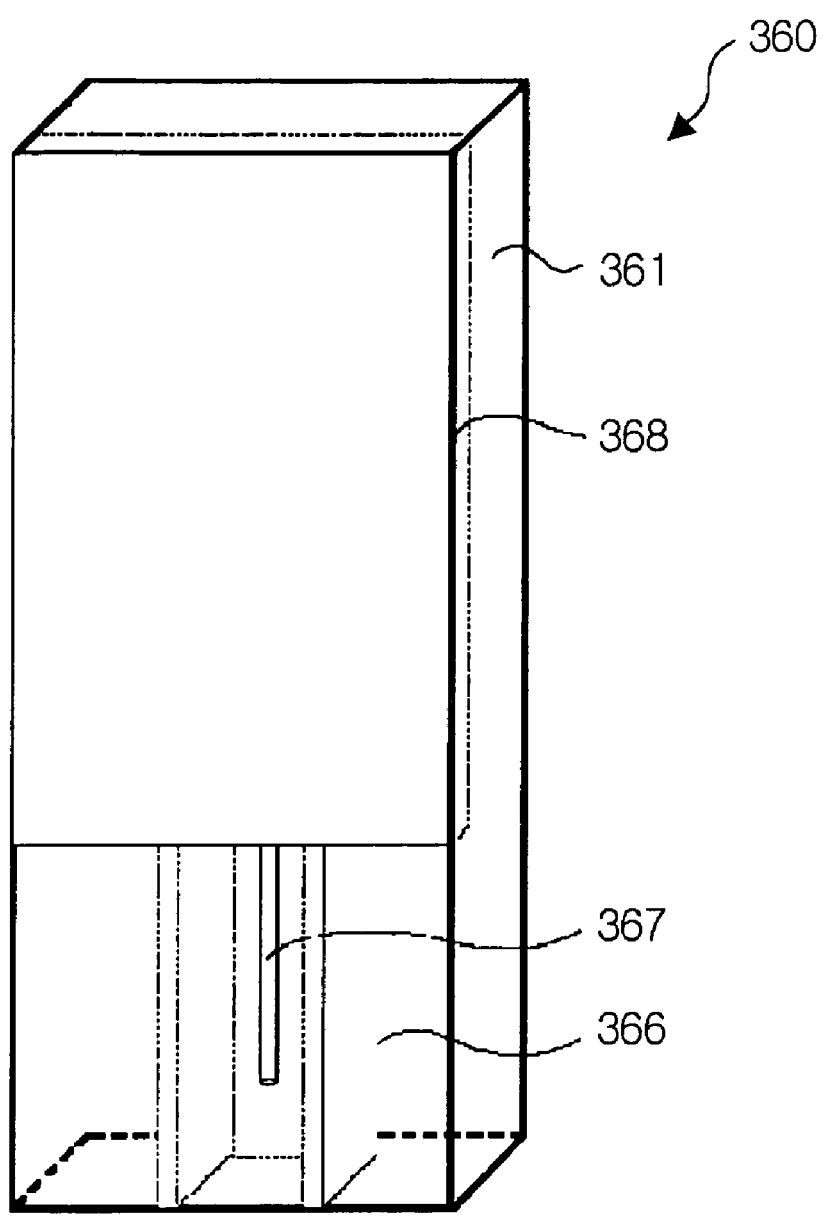
FIG. 24 is a rear view of a mobile phone according to the eighteenth embodiment of the present invention.

In a mobile phone 360 according to the eighteenth embodiment of the present invention shown in FIG. 24, an electromagnetic wave absorber 366 and an antenna 367 are arranged adjacent to a lower edge of the housing 361 of the mobile phone 360.

The mobile phone 360 according to the eighteenth embodiment has the same structure as the mobile phone 310 according to the thirteenth embodiment excepting for the positions of the electromagnetic wave absorber 366 and the antenna 367. In FIG. 24, reference numerals greater by 50 than used in FIGS. 17 to 19 are used to designate the elements identical or corresponding to the elements of the 13th embodiment, respectively. Thus, explanation on the portions identical to the embodiment shown in FIGS. 17 to 19 will be referred to the corresponding explanation relating to the 13th embodiment and omitted hereinafter.

Figure 25:
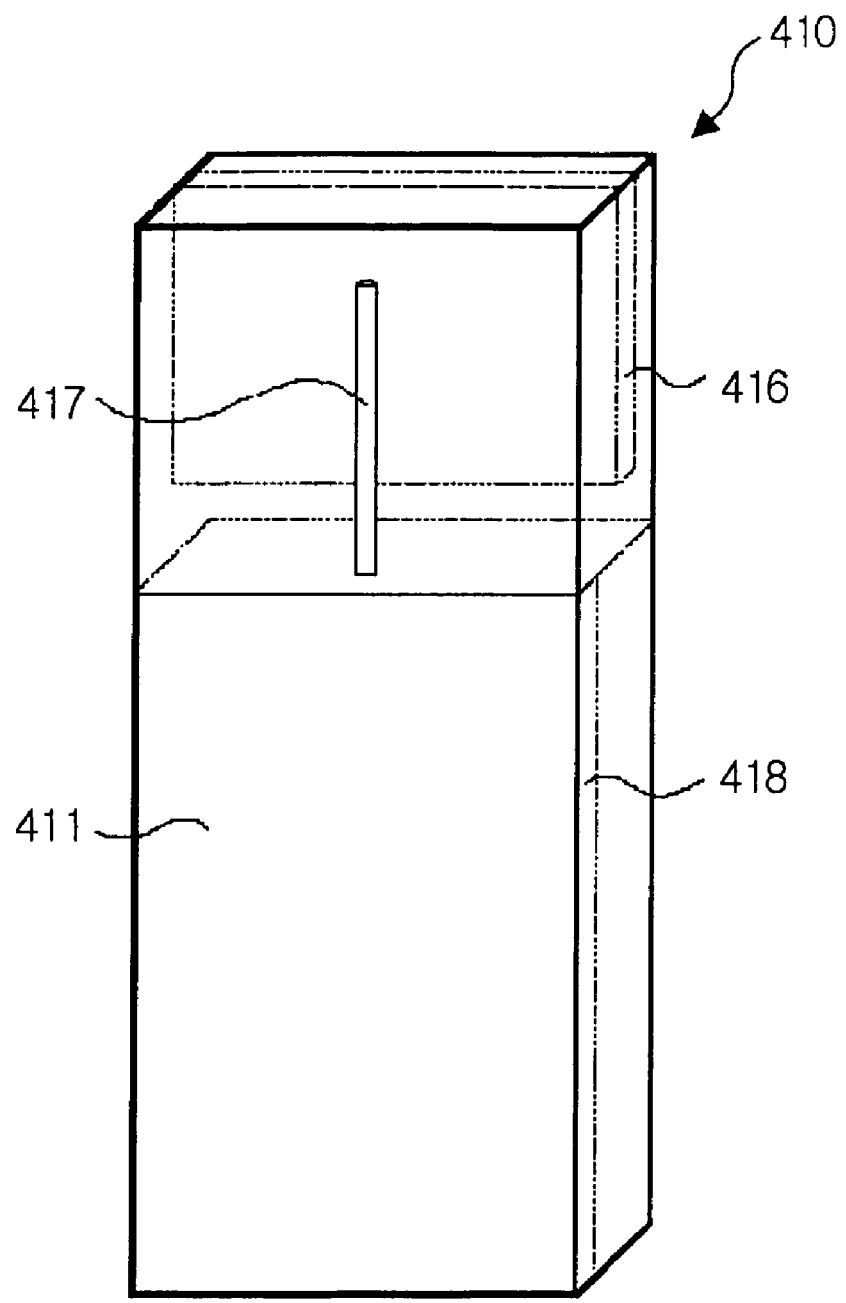
FIG. 25 is a rear view of a mobile phone according to the nineteenth embodiment of the present invention.

FIG. 25 illustrates a structure of a mobile phone according to the nineteenth embodiment of the present invention.

Same as the first embodiment, an electromagnetic wave absorber 416 is arranged between an antenna 417 and a circuit board 419. Since the electromagnetic wave absorber 416 absorbs the electromagnetic wave reflected from the conductive plates constituting the circuit boards 419, the adverse effects of the resonance of the antenna 417 reduced. When arranging the electromagnetic wave absorber 416 over the whole length of the antenna 417, since the electromagnetic wave absorber 416 absorbs the electromagnetic wave propagating toward the direction of the electromagnetic wave absorber 416, the gain of the antenna 417 may decrease more or less. Therefore, unlike the first embodiment, the electromagnetic wave absorber 416 in this embodiment is arranged to cover only a part of the length of antenna 417, and the rest part of the antenna is not covered by the electromagnetic wave absorber in order to allow the access of the electromagnetic wave to the antenna 417. In this embodiment, the electromagnetic wave absorber 416 is arranged to expose the lower part of antenna 417.

The mobile phone 410 according to the nineteenth embodiment has the same structure as the mobile phone according to the first embodiment excepting for the above-mentioned shape of the electromagnetic wave absorber 416. Although the electromagnetic wave absorber 416 is arranged to cover only a part of the antenna 417, it may absorb a major part of the electromagnetic wave generated from the antenna 417 and the front-side of the mobile phone 410 and propagating toward the user. Therefore, the mobile phone according to this embodiment can significantly reduce the amount of the electromagnetic wave, i.e. the specific absorption rate (SAR) during the use of the mobile phone.

Figure 26:
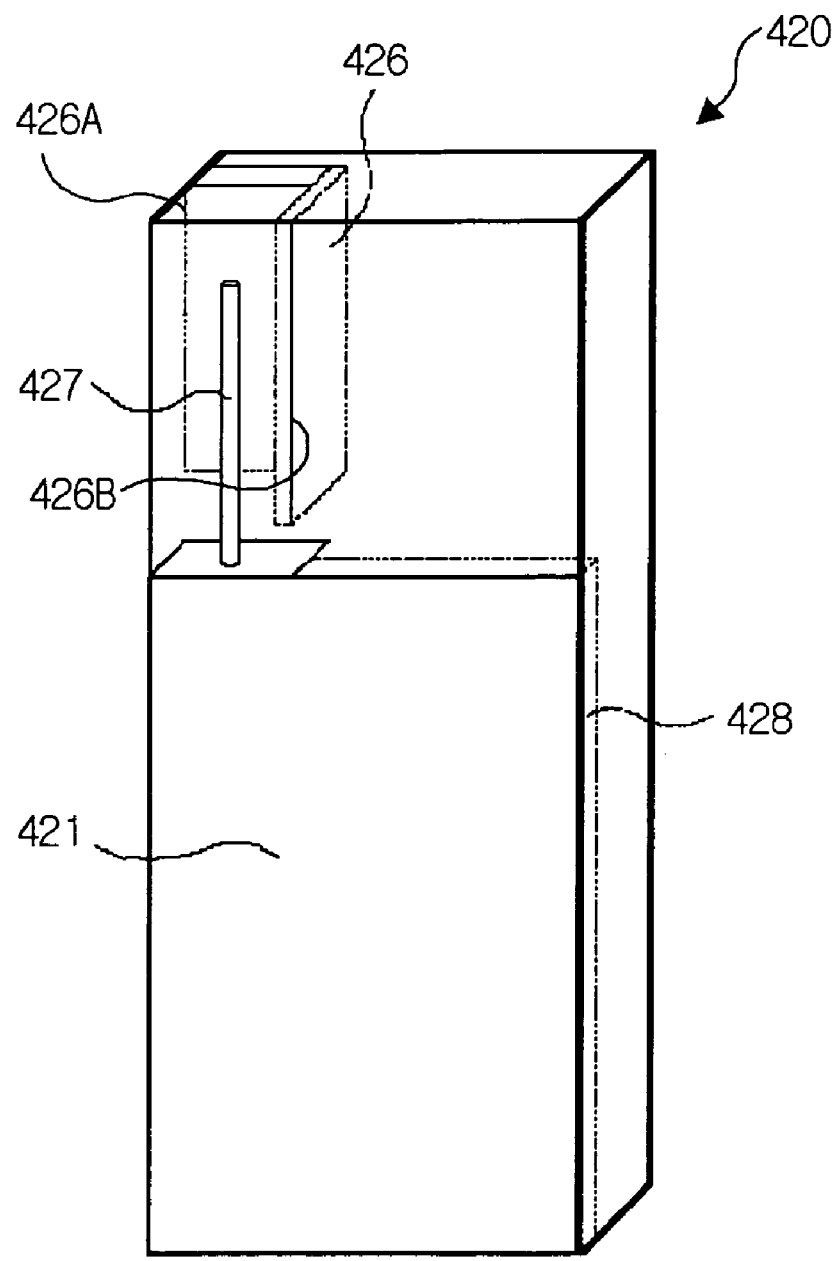
FIG. 26 is a rear view of a mobile phone according to the twentieth embodiment of the present invention.

FIG. 26 illustrates a structure of a mobile phone according to the twentieth embodiment of the present invention. In the mobile phone 420 according to this embodiment, the cross-section of an electromagnetic wave absorber 426 taken along the lateral-direction of the mobile phone 420 has an angled L-shape in which a first wall 426A and a second wall 426B meet with each other at an angle of 90°. The first wall 426A is attached to a circuit board 429. And, at a side of the first wall 426A, the second wall 426B is extended toward the rear wall of a housing 421, and the other side of the first wall 426A adjoins a side wall of the housing 421. An antenna 427 is arranged in square space formed by the two walls of the electromagnetic wave absorber 426 and the housing 421. In this embodiment, like the nineteenth embodiment, the electromagnetic wave absorber 426 is arranged to cover only a part of the antenna 427 and expose lower part of the antenna.

The mobile phone 420 according to the twentieth embodiment has the same structure as the mobile phone 410 according to the nineteenth embodiment excepting that the shape of the electromagnetic wave absorber 426 and the position of the antenna 427 are different from those of the nineteenth embodiment. In FIG. 26, reference numerals greater by 10 than used in FIG. 25 are used to designate the elements identical or corresponding to the elements of the 19th embodiment. Thus, explanation on the portions identical to the embodiment shown in FIG. 25 will be referred to the corresponding explanation relating to the 19th embodiment and omitted hereinafter.

Figure 27:
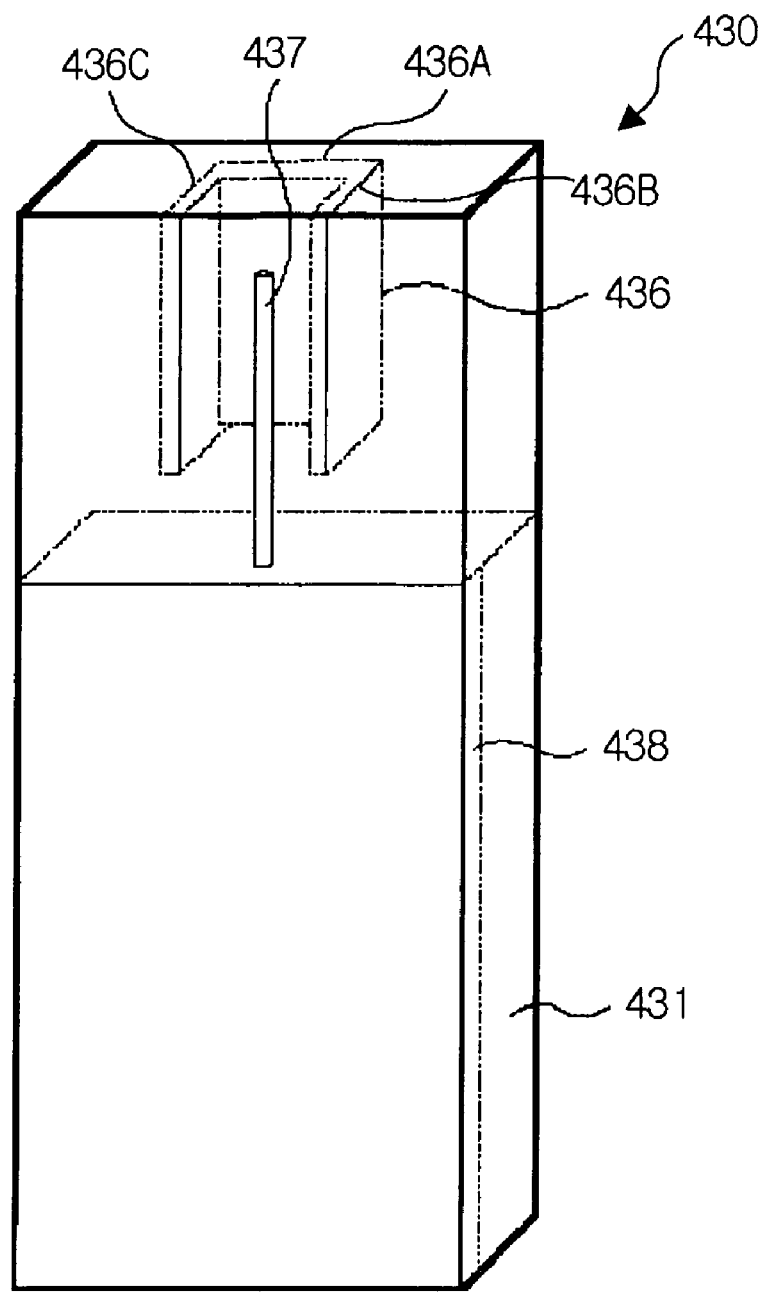
FIG. 27 is a rear view of a mobile phone according to the twenty-first embodiment of the present invention.

FIG. 27 illustrates a structure of a mobile phone 430 according to the twenty-first embodiment of the present invention. In the electromagnetic wave absorber 436 according to this embodiment, the outer surface of a bottom part 436A is attached to a circuit board 439, and a pair of side-walls 436B, 436C formed at both sides of the bottom part 436A are provided to form a shape of elongated channel protruding from the circuit board 439. In this embodiment, the cross-section of the electromagnetic wave absorber 436 has an angled U-shape. That is, the bottom part 436A and the side-walls 436B, 436C make an angle of 90°. An antenna 437 having a shape of elongated pipe is arranged in the electromagnetic wave absorber 436. The opening of the electromagnetic wave absorber 436 preferably makes an angle of 90° to 180° with respect to the center of the antenna 437 arranged in the electromagnetic wave absorber 436. Also, in assembled mobile phone 430, the opening of the electromagnetic wave absorber 436 is preferably closed by at least one surface of the housing 431. In this embodiment, the opening is closed by the rear wall of the housing 431. In this embodiment, like the nineteenth embodiment, the electromagnetic wave absorber 436 is arranged to cover only a part of the antenna 437, and expose the lower part of the antenna.

The mobile phone 430 according to the twenty-first embodiment has the same structure as the mobile phone 410 according to the nineteenth embodiment excepting that the shape of the electromagnetic wave absorber 436 is different from that of the nineteenth embodiment. In FIG. 27, reference numerals greater by 20 than used in FIG. 25 are used to designate the elements identical or corresponding to the elements of the 19th embodiment, respectively. Thus, explanation on the portions identical to the embodiment shown in FIG. 25 will be referred to the corresponding explanation relating to the 19th embodiment and omitted hereinafter.

Figure 28:
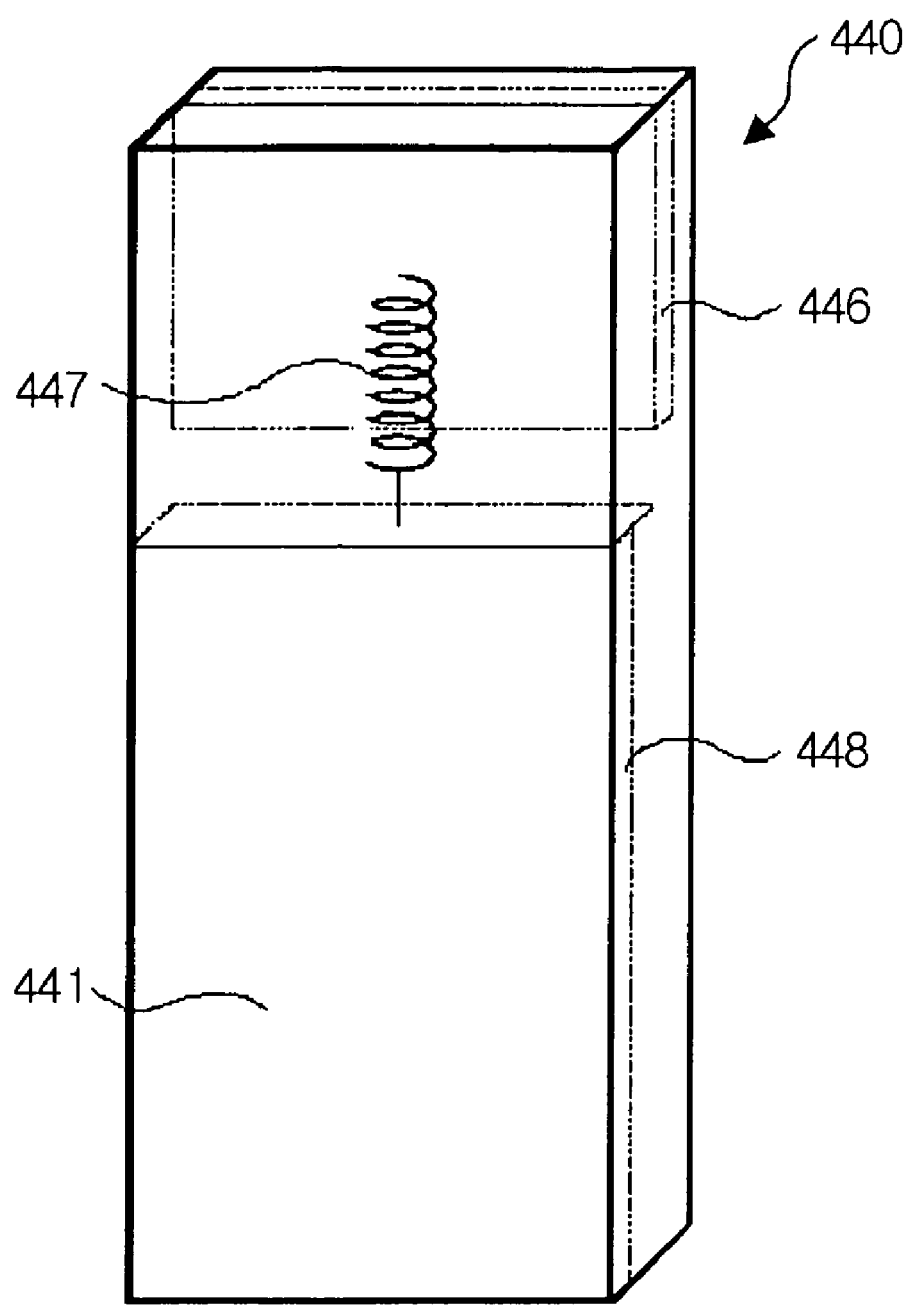
FIG. 28 is a rear view of a mobile phone according to the twenty-second embodiment of the present invention.

A mobile phone 440 according to the twenty-second embodiment of the present invention shown in FIG. 28 uses an antenna 447 with a helical-type emitting.

The mobile phone 440 according to the twenty-second embodiment has the same structure as the mobile phone 410 according to the nineteenth embodiment excepting that the antenna 447 has a helical-type radiating element. In FIG. 28, reference numerals greater by 30 than used in FIG. 25 are used to designate the elements identical or corresponding to the elements of the 19th embodiment. Thus, explanation on the portions identical to the embodiment shown in FIG. 25 will be referred to the corresponding explanation relating to the 19th embodiment and omitted hereinafter.

Figure 29:
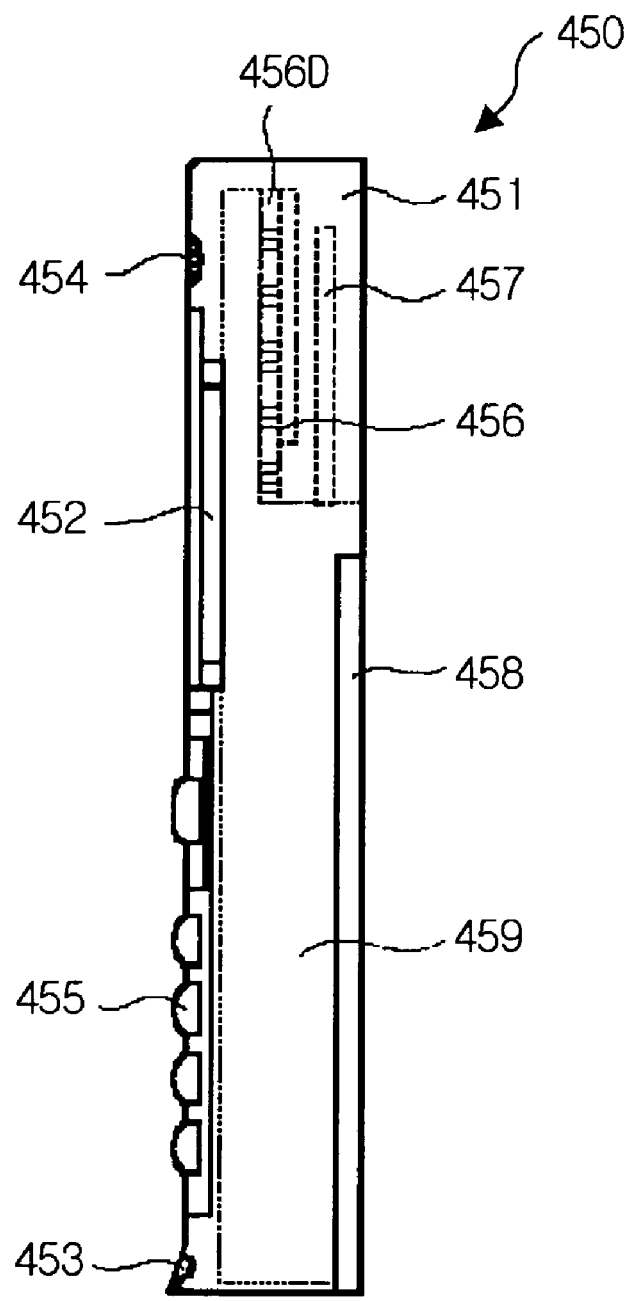
FIG. 29 is a right-side view of a mobile phone according to the twenty-third embodiment of the present invention.

A mobile phone 450 according to the twenty-third embodiment of the present invention shown in FIG. 29 arranges a conductive plate 456D between a circuit board 459 and an electromagnetic wave absorber 456. The conductive plate 456D functions to shield electromagnetic wave propagating from the antenna to the head of user via the electromagnetic wave absorber 456.

The mobile phone 450 according to the twenty-third embodiment has the same structure as the mobile phone 410 according to the nineteenth embodiment excepting that the conductive plate 456D is arranged between the circuit board 459 and the electromagnetic wave absorber 456. In FIG. 29, reference numerals greater by 40 than used in FIG. 25 are used to designate the elements identical or corresponding to the elements of the 19th embodiment, respectively. Thus, explanation on the portions identical to the embodiment shown in FIG. 25 will be referred to the corresponding explanation relating to the 19th embodiment and omitted hereinafter.

Figure 30:
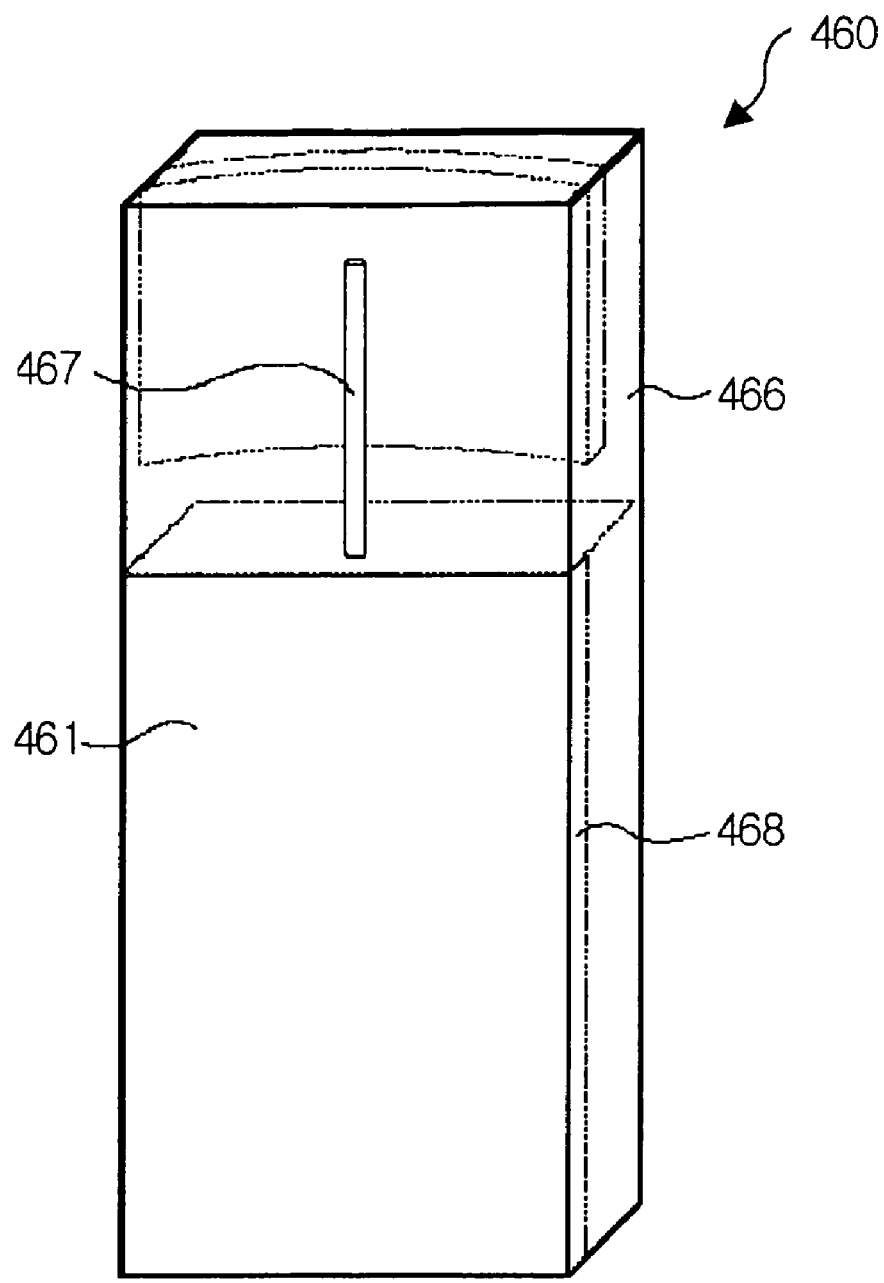
FIG. 30 is a rear view of a mobile phone according to the twenty-fourth embodiment of the present invention.

In a mobile phone 460 according to the twenty-fourth embodiment of the present invention shown in FIG. 30, the electromagnetic wave absorber 466 viewed from the lateral-direction of the mobile phone 460 has a rectangular-shape, and electromagnetic wave absorber protrudes toward to the front-side of the mobile phone 460.

The mobile phone 460 according to the twenty-fourth embodiment has the same structure as the mobile phone 410 according to the nineteenth embodiment excepting that the electromagnetic wave absorber 466 has a shape protruding toward the front side of the mobile phone. In FIG. 30, reference numerals greater by 50 than used in FIG. 25 are used to designate the elements identical or corresponding to the elements of the 19th embodiment. Thus, explanation on the portions identical to the embodiment shown in FIG. 25 will be referred to the corresponding explanation relating to the 19th embodiment and omitted hereinafter.

Figure 31:
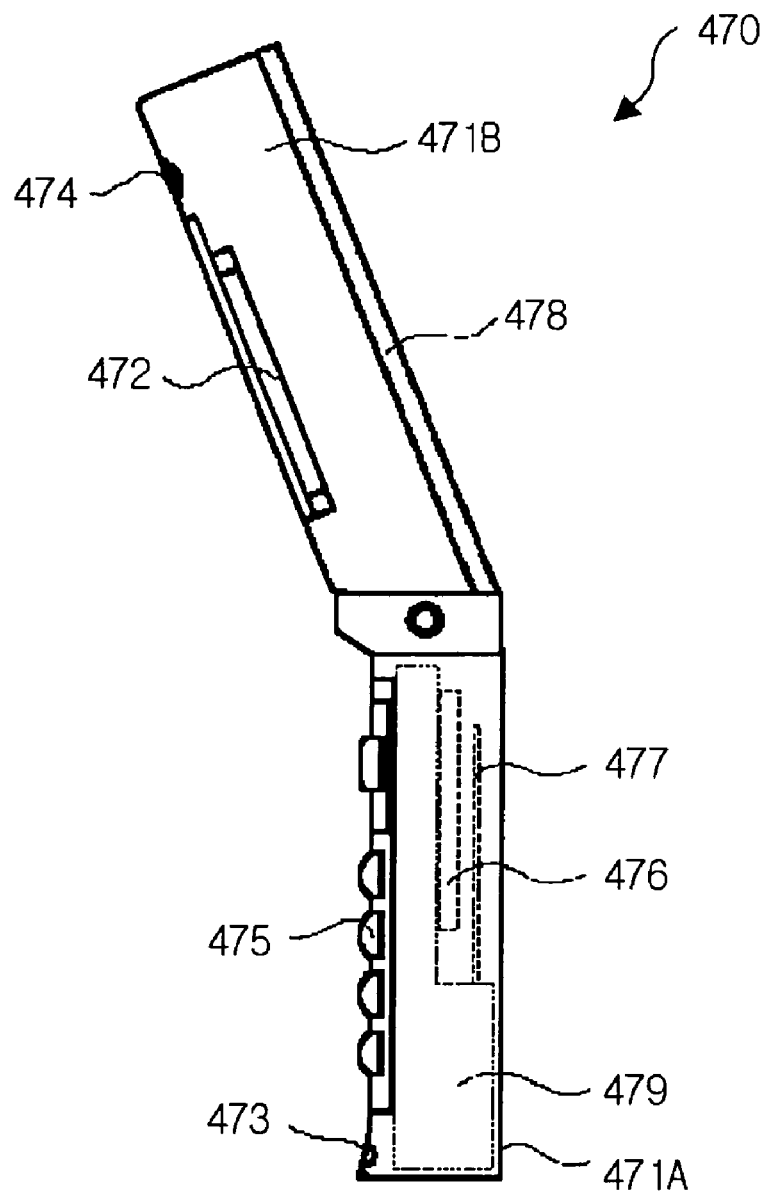
FIG. 31 is a right-side view of a mobile phone according to the twenty-fifth embodiment of the present invention.

In a mobile phone 470 according to the twenty-fifth embodiment of the present invention shown in FIG. 31, a housing of the mobile phone 470 is a folder-type housing composed of a main housing member 471A and a sub housing member 471B being connected to each other by a hinge. In this embodiment, an electromagnetic wave absorber 476 and an antenna 477 are installed in the main housing member 471A. Alternatively, the electromagnetic wave absorber 476 and the antenna 477 may be installed in the sub housing member 471B.

The mobile phone 470 according to the twenty-fifth embodiment has the same structure as the mobile phone 410 according to the nineteenth embodiment excepting that the housing of the mobile phone 470 is a folder-type housing composed of a main housing member 471A and a sub housing member 471B. In FIG. 31, reference numerals greater by 60 than used in FIG. 25 are used to designate the elements identical or corresponding to the elements of the 19th embodiment. Thus, explanation on the portions identical to the embodiment shown in FIG. 25 will be referred to the corresponding explanation relating to the 19th embodiment and omitted hereinafter.

Figure 32:
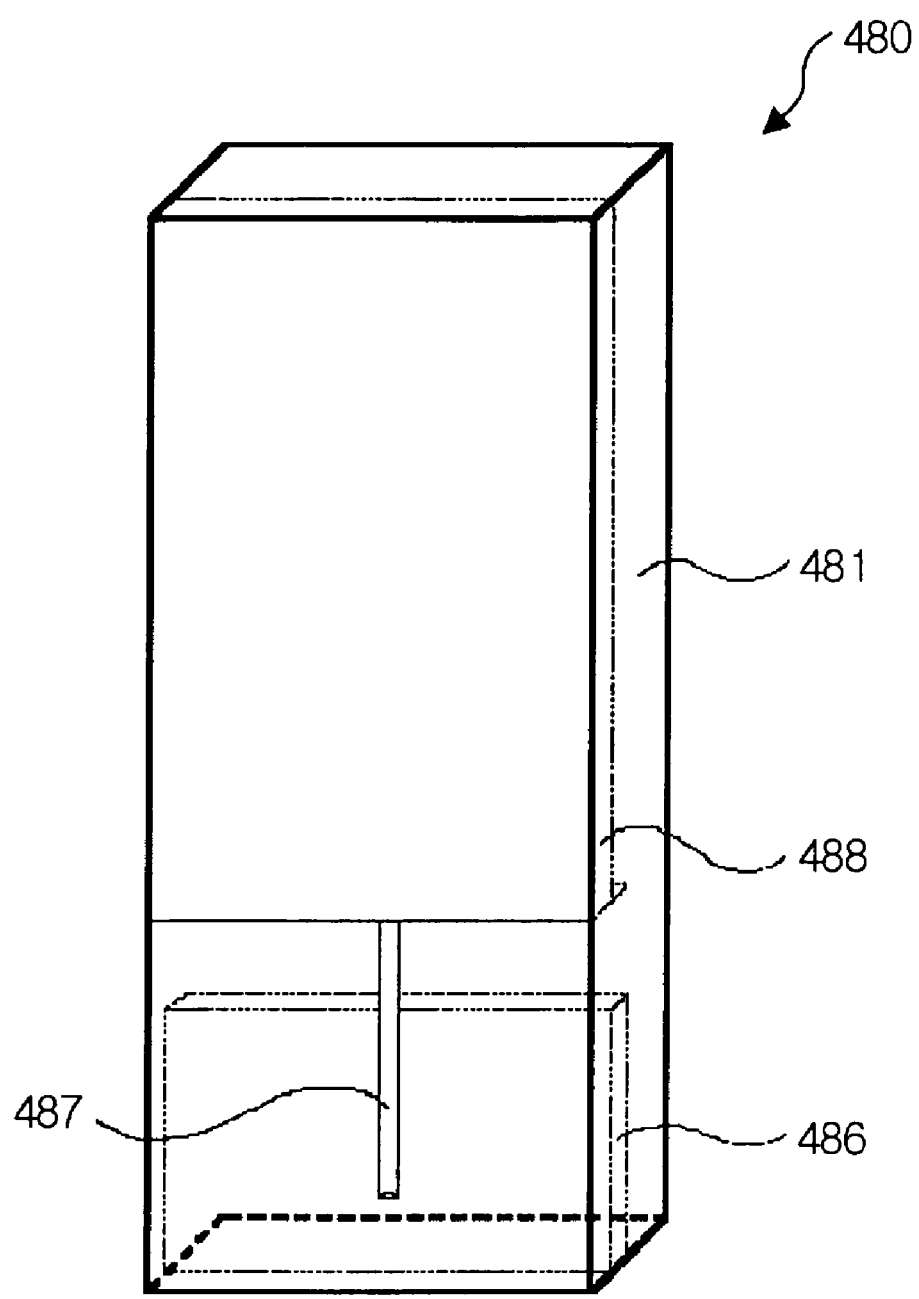
FIG. 32 is a rear view of a mobile phone according to the twenty-sixth embodiment of the present invention.

In a mobile phone 480 according to the twenty-sixth embodiment of the present invention shown in FIG. 32, an electromagnetic wave absorber 486 and an antenna 487 are arranged adjacent to the lower edge of the housing 481 of the mobile phone 480. In this embodiment, unlike to the electromagnetic wave absorber 416 of the mobile phone 410 according to the nineteenth embodiment, the electromagnetic wave absorber 486 covers only a part of the antenna 487, and upper part of the antenna 487 is not covered by the electromagnetic wave absorber 486.

The mobile phone 480 according to the twenty-sixth embodiment has the same structure as the mobile phone 410 according to the nineteenth embodiment excepting for the positions of the electromagnetic wave absorber 486 and the antenna 487. In FIG. 32, reference numerals greater by 70 than used in FIG. 25 are used to designate the elements identical or corresponding to the elements of the 19th embodiment. Thus, explanation on the portions identical to the embodiment shown in FIG. 25 will be referred to the corresponding explanation relating to the 19th embodiment and omitted hereinafter.

The present invention has been described with reference to particular embodiments with particular applications. Those having ordinary skill in the art and access to the teachings of the present invention will recognize additional modifications and applications within the scope of the present invention.

Therefore, since the present invention uses an antenna structure as described above and arranges the antenna inside of the mobile phone housing, and positions an electromagnetic wave absorber between the antenna and circuit board, the electromagnetic wave absorber can absorb the electromagnetic wave reflected form conductive plate constituting the circuit board. Thus, the present invention may eliminate or substantially lower the amount of the electromagnetic wave being absorbed by the body of users so that users may use the mobile phone without being exposed to hazardous electromagnetic wave.

What we claim:

1. A mobile phone comprising:
   at least one circuit board being used to accommodate various electronic devices performing various functions such as transmission and reception of electromagnetic waves;
   a housing having an inside in which said circuit board is contained; and
   an antenna arranged in the inside of the housing at a position adjoining a rear wall of the housing with a distance from a nearest circuit board, and being used to allow electronic devices installed on said circuit board to transmit and receive the electromagnetic waves; and
   wherein an electromagnetic wave absorber is arranged between said antenna and the nearest circuit board to the antenna while covering the length of the antenna except a lower part thereof,
   wherein the electromagnetic wave absorber encloses a circumference of the antenna with a degree greater than 180° through having a first wall attached to the nearest circuit board and a second wall extending from at least one side of the first wall toward the rear wall of the housing.

2. The mobile phone of claim 1, wherein the housing comprises a type selected from a group consisting of a bar-type, a flip-type, and a folder-type.

3. The mobile phone of claim 1, further comprising at least one conductive plate arranged between said circuit board and said electromagnetic wave absorber.

4. The mobile phone of claim 1, wherein said electromagnetic wave absorber has a rectangular-shape when viewed from the front side of the mobile phone, and the cross-section of said electromagnetic wave absorber taken along a lateral direction of the mobile phone protrudes toward a front-side of the mobile phone.

5. The mobile phone of claim 1, wherein said electromagnetic wave absorber is open with a range of 90° to less than 180° around the center of the antenna, and its lateral cross-section has a shape selected from a group consisting of a circle, a triangle, a quadrangle, a polygon, and an ellipse.

6. The mobile phone of claim 2, wherein said housing comprises a folder-type housing composed of a main housing member and a sub housing member, and said electromagnetic wave absorber and the antenna are installed within one of the main housing member or within the sub housing member.

7. The mobile phone of claim 1, wherein said electromagnetic wave absorber and the antenna are arranged adjacent to an upper wall of the housing.

8. The mobile phone of claim 1, wherein said electromagnetic wave absorber and the antenna are arranged adjacent to a lower wall of the housing.

9. The mobile phone of claim 1, wherein said antenna comprises a monopole antenna.

10. The mobile phone of claim 9, wherein said antenna has a lateral cross-section of a shape selected from a group consisting of a circle, a triangle, a quadrangle, a polygon, and an ellipse.

11. The mobile phone of claim 9, wherein said antenna has a shape selected from a group consisting of a helical-shape, a conical-shape, and a spherical-shape.

12. The mobile phone of claim 1, wherein said electromagnetic wave absorber has a shape selected from a group consisting of a circle-shape, a triangle-shape, a quadrangle-shape, a polygon-shape, and an ellipse-shape when viewed from a front side of the mobile phone.

* * * * *